3,781,276
6-AZIDO-6-DEHYDRO STEROIDS OF THE PROGESTERONE SERIES, METHODS FOR THEIR MANUFACTURE AND INTERMEDIATES PRODUCED THERBY
Elliot L. Shapiro, Cedar Grove, N.J., George J. Teutsch, Nancy, France, and Hershel L. Herzog, Glen Ridge, N.J., assignors to Schering Corporation, Bloomfield, N.J.
No Drawing. Continuation-in-part of abandoned application Ser. No. 58,163, July 24, 1970. This application July 11, 1972, Ser. No. 272,937
Int. Cl. C07c *173/10*
U.S. Cl. 260—239.55  26 Claims

ABSTRACT OF THE DISCLOSURE 6-azido-6-dehydroprogesterones and 6-azido-1,6-bis-dehydroprogesterones possess progestational and anti-androgenic properties. Preferred are the 6-azido-16-methylene-17α-lower alkanoyloxy-4,6-pregnadiene-3,20-diones. Compounds useful as intermediates are 6β-azido-7α-hydroxyprogesterones and the 7α-acylates thereof.

The 6-azido-6-dehydroprogesterones are prepared by treating a 6α,7α-oxido-4-pregnene with an alkali metal azide in an aqueous inert organic solvent; esterifying the thereby formed 6β-azido-7α-hydroxy - 4 - pregnene; and treating the resulting 6β-azido-7α-acyloxy-4-pregnene with a tetraalkylammonium halide in an aprotic solvent. Alternatively, the 6-azido-4,6-pregnadienes are prepared by treating a 6β-azido-7α-hydroxyprogesterone or 7α-acylate thereof with concentrated hydrochloric acid in a lower alkanoic acid in an inert solvent.

The 6-azido-1,4,6-pregnatriene-3,20-diones are prepared by treating a 6-azido-4,6-pregnadiene with 2,3-dichloro-5,6-dicyanobenzoquinone in the presence of a strong acid and water.

This is a continuation of application Ser. No. 58,163, filed July 24, 1970, now abandoned.

FIELD OF THE INVENTION

This invention relates to compositions of matter and to processes for their preparation.

More specifically, this invention relates to compositions of matter which may be classified as 6-azido-6-dehydrosteroids of the progesterone series, to methods for their manufacture, and to intermediates produced thereby.

SUMMARY OF THE INVENTION

The invention sought to be patented in one composition-of-matter aspect resides in the concept of a chemical compound having a molecular structure comprising a steroid of the progesterone series having a 6-azido substituent and an additional double bond between C–6 and C–7, said steroids possessing progestational activity. Preferred species of this invention are 6-azido-16-lower alkylidene-17α-lower alkanoyloxy - 6 - dehydroprogesterones, particularly 6 - azido-16-methylene-17α-acetoxy-4,6-pregnadiene-3,20-dione.

The invention sought to be patented in another composition-of-matter aspect resides in the concept of a chemical compound having a molecular structure comprising a steroid with a progesterone nucleus and having an azido group at C–6 and a hydroxyl group or ester thereof at C–7 which are useful mainly as intermediates in preparing the pharmacologically active azido-6-dehydroprogesterones of our invention.

The invention sought to be patented in one process aspect resides in the concept of preparing the preferred 6-azido-6-dehydroprogesterones of our invention which comprises treating a 6α,7α-oxidoprogesterone with an alkali metal azide (preferably sodium azide) in an aqueous, non-reactive organic solvent esterifying the thereby formed 6β-azido-7α-hydroxyprogesterone, and treating the resulting 6β-azido-7α-acyloxyprogesterone with a tetraalkylammonium halide (preferably tetramethylammonium fluoride) in an aprotic solvent whereby is formed a 6-azido-6-dehydroprogesterone of our invention.

The invention sought to be patented in another process aspect provides another method for preparing the preferred 6-azido-6-dehydroprogesterones of our invention and resides in the concept of treating a member selected from the group consisting of a 6β-azido-7α-hydroxy-progesterone and the 7α-acyloxy derivatives thereof with concentrated hydrochloric acid in a lower alkanoic acid (preferably acetic acid) in an inert solvent, e.g. acetone or dioxane, whereby is formed a 6-azido-6-dehydroprogesterone of our invention.

The invention sought to be patented in yet another process aspect resides in the concept of a method for preparing 6-azido-1,6-bis-dehydroprogesterones which comprises treating a 6-azido-6-dehydroprogesterone in an inert solvent with 2,3-dichloro-5,6-dicyanobenzoquinone in the presence of a strong acid and, frequently, also in the presence of water, whereby is formed a 6-azido-1,6-bis-dehydroprogesterone of our invention.

GENERAL DESCRIPTION OF THE 6-AZIDO-6-DEHYDROPROGESTERONE PRODUCT ASPECT OF THE INVENTION

The composition of matter aspect of this invention includes compounds selected from the group consisting of 6-azido-6-dehydroprogesterones of the following structural Formula I and the 1-dehydro analogs thereof:

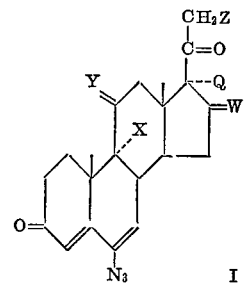

wherein Q is a member selected from the group consisting of hydroxy, OR wherein R is an acyl radical of a hydrocarbon carboxylic acid having up to 12 carbon atoms, and hydrogen provided W is hydrogen or (H, lower alkyl);

W is a member selected from the group consisting of (H,α-hydroxy), hydrogen, (H,α-alkyl), (H,β-alkyl), (H,α-OR') wherein R' is an acyl radical of a hydrocarbon carboxylic acid having up to 12 carbon atoms; =CHT wherein T is a member selected from the group consisting of hydrogen, alkyl, chlorine and fluorine, and W taken together with Q when Q is α-hydroxy and W is (H,α-hydroxy), the 16α,17α-alkylidene derivatives thereof;

X is a member selected from the group consisting of hydrogen and halogen having an atomic weight less than 100;

Y is a member selected from the group consisting of hydrogen, oxygen (H,β-OH'), and (H,β halogen of atomic weight less than 100) provided X is halogen; and Z is a member selected from the group consisting of hydrogen and halogen (preferably fluorine).

The alkyl groups included within the definition of the substituents W and T are preferably lower alkyl groups, i.e. hydrocarbon radicals having preferably up to four carbon atoms such as methyl, ethyl, n-propyl, iso-propyl, n-butyl, sec.-butyl, and tert.-butyl, although higher homologs such as pentyl and hexyl come within the scope of this invention.

The alkylidene groups contemplated in the compounds of our invention are preferably lower alkylidenes, i.e. hydrocarbon radicals having preferably up to four carbon atoms and having a terminal double bond, including radicals such as methylene, ethylidene, n-propylidene, isopropylidene, n-butylidene, and sec.-butylidene and the like. The 16-lower alkylidene derivatives of this invention (i.e. when W in above Formula I is =CHT) are double bonded to the D-ring at C–16. The 16α,17α-alkylidenedioxy derivatives have the alkylidene terminal bonds attached to different oxygen atoms, i.e. to the oxygens at C–16 and C–17 in the case of the 16α,17α-alkylidenedioxy derivatives.

As used in the specification and claims of this application, the term "acyl" denotes an organic radical derived from an organic acid by the removal of the hydroxyl group, e.g. acetyl is the acyl radical of acetic acid, benzenesulfonyl is the acyl radical of benzenesulfonic acid, and benzoyl is the acyl radical of benzoic acid.

The acyl radicals of the compounds of this invention as defined by Formula I hereinabove include those derived from hydrocarbon carboxylic acids having up to 12 carbon atoms which may be saturated, unsaturated, straight chain or branched chain, aliphatic, cyclic, cyclic-aliphatic, aromatic, aryl-aliphatic, or alkyl-aromatic, and may be substituted by hydroxy, alkoxy containing from 1 to 5 carbon atoms or by halogen such as fluorine, chlorine, or bromine. Typical ester groups of the 6-azido-6-dehydroprogesterones of our invention are thus derived from hydrocarbon carboxylic acids such as alkanoic acids exemplified by formic, acetic, propionic, trimethylacetic, butyric, iso-butyric, valeric, iso-valeric, caproic, caprylic, capric, undecylic and lauric acids; substituted alkanoic acids such as phenoxyacetic, trifluoroacetic, and β-chloropropionic acids, aromatic and substituted aromatic acids including benzoic, toluic, p-chlorobenzoic acids; arylalkanoic acids such as phenylacetic and phenylpropionic acids; unsaturated acids such as acrylic and sorbic acids; and dibasic acids such as succinic, tartaric and phthalic acids.

The term "lower alkanoyloxy" is contemplated as including acid radicals of lower alkanoic acids having preferably up to eight carbon atoms such as radicals obtained from acetic, propionic, butyric, valeric, caprylic, caproic, tert.-butylacetic acid and the like.

The halogens at C–9 as defined by X in above Formula I are bromine, chlorine, and preferably fluorine. The halogens at C–21 as defined by Z in above Formula I are fluorine, chlorine, bromine and iodine, the 21-bromo- and 21-iodoprogesterones of this invention being valuable mainly as intermediates.

The physical embodiment of the 6-azido-6-dehydroprogesterones of Formula I and the 1-dehydro-analogs thereof are characterized by being crystalline solids, usually off white to tan in color, which are insoluble in water and soluble in most organic solvents, particularly in dioxane, although of limited solubility in dialkyl ethers and alkyl hydrocarbons.

The new compounds defined by Formula I possess pharmacological and therapeutic properties and may be used as medicaments in conditions requires a progestational agent, e.g. in fertility control and in the management of various menstrual disorders. They may be administered via the oral or intramuscular route in a manner similar to that in which known progestational agents, e.g. progesterone, are administered, the dosage depending on the age and size of the patient and in the nature and severity of the ailment being treated. The progestational activity of compounds of Formula I was demonstrated in studies in immature rats by the well known Clauberg method via the oral and intramuscular route.

For example, in this test, 6-azido-16-methylene-17α-acetoxy-4,6-pregnadiene-3,20-dione is about 20 times as active as progesterone via the intramuscular route.

Our new compounds are also useful in the treatment of disorders requiring anti-androgen therapy such as in the treatment of acne, or benign prostatic hypertrophy. The anti-androgenic activity of compounds of Formula I was studied in the intact male immature rat by the test described by R. O. Neri et al., Eur. J. Pharm. 1, 438–444 (1967) (Section 2.1.2, p. 439). It was demonstrated, for example, that at 10 mgm./kgm. doses administered subcutaneously in sesame oil, anti-androgenic activity was exhibited by compounds of Formula I, e.g. 6-azido-16-methylene-17α-acetoxy-4,6-pregnadiene-3,20-dione.

Typical formulations incorporating the active 6-azido-16-lower alkylidene-17α-lower alkanoyloxy - 6 - dehydroprogesterone of this invention are described hereinbelow as Formulations I to III.

Preferred compounds of our invention include 6-azido-16-lower alkylidene - 6 - dehydroprogesterones which are substituted at C–17 by a hydroxy group or a lower alkanoyloxy group (i.e. compounds of Formula I wherein Q is hydroxy or lower alkanoyloxy and W is =CHT, T being H, lower alkyl, chlorine, fluorine) exemplified by compounds such as:

6-azido-16-methylene-17α-acetoxy-4,6-pregnadiene-3,20-dione,
6-azido-16-n-butylidene-17α-acetoxy-4,6-pregnadiene-3,20-dione,
6-azido-16-methylene-17α-propionoxy-4,6-pregnadiene-3,20-dione,
6-azido-9α,11β-dichloro-16-methylene-17α-acetoxy-4,6-pregnadiene-3,20-dione,
6-azido-9α,11β-dichloro-16-ethylidene-17α-acetoxy-4,6-pregnadiene-3,20-dione,
6-azido-9α-bromo-11β-fluoro-16-methylene-17α-acetoxy-4,6-pregnadiene-3,20-dione,
6-azido-9α-fluoro-11β-hydroxy-16-methylene-17α-acetoxy-4,6-pregnadiene-3,20-dione,
6-azido-9α-fluoro-16-methylene-17α-acetoxy-4,6-pregnadiene-3,11,20-trione,
6-azido-11β-hydroxy-16-methylene-17α-acetoxy-4,6-pregnadiene-3,20-dione,
6-azido-16-methylene-17α-acetoxy-4,6-pregnadiene-3,11,20-trione,
6-azido-16-methylene-17α-acetoxy-21-fluoro-4,6-pregnadiene-3,20-dione,
6-azido-9α,11β-dichloro-21-fluoro-16-methylene-17-acetoxy-4,6-pregnadiene-3,20-dione,
6-azido-16-chloromethylene-4,6-pregnadiene-17α-acetoxy-4,6-pregnadiene-3,20-dione,
6-azido-9α-fluoro-16-chloromethylene-17α-acetoxy-4,6-pregnadiene-11β-ol-3,20-dione,
6-azido-16-fluoromethylene-17α-acetoxy-4,6-pregnadiene-3,20-dione,
6-azido-9α-fluoro-16-fluoromethylene-17α-acetoxy-4,6-pregnadiene-11β-ol-3,20-dione,
6-azido-16-chloromethylene-17α-acetoxy-4,6-pregnadiene-11β-ol-3,20-dione, and the analogous 17α-hydroxy derivatives of the aforesaid compounds.

Of the foregoing these 6-azido-16-methylene-17α-lower alkanoyloxy-6-dehydroprogesterones which are unsubstituted at C–9, C–11, and C–21 (i.e. compounds of Formula I wherein X, Y, and Z are hydrogen, Q is lower alkanoyloxy, and W is =CHT, T being hydrogen) are a preferred species, particularly 6-azido-15-methylene-17α-acetoxy-4,6-pregnadiene-3,20-dione.

Included among the compounds of our invention are 6-azido - 16α,17α - dihydroxy-6-dehydroprogesterones of Formula I and their 16α,17α-iso-propylidene derivatives (i.e. compounds of Formula I wherein W is (H,αOH)

and Q is hydroxy and their 16α,17α-alkylidene derivatives) exemplified by compounds such as:

6-azido-16α,17α-dihydroxy-4,6-pregnadiene-3,20-dione and the 16α,17α-iso-propylidene derivative thereof,
6-azido-9α,11β-dichloro-16α,17α-dihydroxy-4,6-pregnadiene-3,20-dione and the 16α,17α-iso-propylidene derivative thereof,
6-azido-9α-fluoro-11β,16α,17α-trihydroxy-4,6-pregnadiene-3,20-dione and the 16α,17α-iso-propylidiene deratives thereof.

Our invention also includes 6-azido-17α-lower alkanoyloxy-6-dehydroprogesterones having a lower alkyl group at C–16 such as:

6-azido-16β-methyl-17α-acetoxy-4,6-pregnadiene-3,20-dione and the 16α-methyl epimer thereof,
6-azido-9α,11β-dichloro16β-methyl-17α-acetoxy-4,6-pregnadiene-3,20-dione and the 16α-methyl epimer thereof,
6-azido-16β-methyl-17α-acetoxy-4,6-pregnadiene-3,11,20-trione and the 16α-methyl epimer thereof,
6-azido-16β-methyl-17α-acetoxy-4,6-pregnadiene-11β-ol-3,20-dione and the 16α-methyl epimer thereof,
6-azido-9α-fluoro-16β-methyl-17α-acetoxy-4,6-pregnadiene-3,11,20-trione and the 16α-epimer thereof,
6-azido-9α-fluoro-11β-hydroxy-16β-methyl-17α-acetoxy-4,6-pregnadiene-3,20-dione and the 16α-methyl epimer thereof,
6-azido-9α,11β-dichloro-16β-methyl-17α-acetoxy-4,6-pregnadiene-3,20-dione and the 16α-methyl epimer thereof, and
6-azido-16β-methyl-17α-acetoxy-21-fluoro-4,6-pregnadiene-3,20-dione and the 16α-methyl epimer thereof.

The corresponding 17α-hydroxy analogs of the foregoing are also contemplated as within the scope of our invention, said compounds being useful mainly as intermediates in preparing the 17-acyloxy compounds of Formula I.

Other compounds of our invention include 6-azido-16-unsubstituted - 17α - hydroxy-21-fluoro-6-dehydroprogesterones and 16-lower alkyl analogs thereof which have topical anti-inflammatory activity. Typical compounds of this group include the following:

6-azido-9α,21-difluoro-4,6-pregnadiene-17α-ol-3,11,20-trione and the 16α-methyl and 16β-methyl analogs thereof;
6-azido-9α,21-difluoro-4,6-pregnadiene-11β,17α-diol-3,20-dione and the 16α-methyl and 16β-methyl analogs thereof;
6-azido-21-fluoro-4,6-pregnadiene-17α-ol-3,11,20-trione and the 16α-methyl and 16β-methyl analogs thereof;
6-azido-21-fluoro-4,6-pregnadiene-17α-ol-3,20-dione and the 16α-methyl and 16β-methyl analogs thereof.

In addition to the foregoing are compounds of Formula I including 6-azido-6-dehydroprogesterones which are unsubstituted at C–17 and which are either unsubstituted or have a lower alkyl group at C–16. Some typical compounds of this class are 6-azido-4,6-pregnadiene-3,20-dione (i.e. 6-azido-6-dehydroprogesterone) and the 16α-methyl and 16β-methyl homologs thereof:

6-azido-21-fluoro-4,6-pregnadiene-3,20-dione and the 16α-methyl and 16β-methyl homologs thereof,
6-azido-4,6-pregnadiene-3,11,20-trione and the 16α-methyl and 16β-methyl homologs thereof,
6-azido-4,6-pregnadiene-11β-ol-3,20-dione and the 16α-methyl and 16β-methyl homologs thereof,
6-azido-9α-fluoro-11β-hydroxy-4,6-pregnadiene-3,20-dione and the 16α-methyl and 16β-methyl homologs thereof,
6-azido-9α,11β-dichloro-4,6-pregnadiene-3,20-dione and the 16α-methyl and 16β-methyl homologs thereof,
6-azido-9α-bromo-11β-chloro-4,6-pregnadiene-3,20-dione and the 16α-methyl and 16β-methyl homologs thereof, and
6-azido-9α,11β-dichloro-21-fluoro-4,6-pregnadiene-3,20-dione and the 16α-methyl and 16β-methyl homologs thereof.

GENERAL DESCRIPTION OF 6-AZIDO - 7 - OXYGENATED-PROGESTERONE COMPOSITION-OF-MATTER ASPECT OF THE INVENTION

The physical embodiments of another composition-of-matter aspect of this invention include novel 6-azido-7α-hydroxyprogesterones and 7-esters thereof useful as intermediates in preparing the preferred 6-azido - 6 - dehydroprogesterones of our invention, said compounds being members selected from the group consisting of 6-azido-7α-oxygenated-progesterones of Formula II and the 1-dehydro analogs thereof:

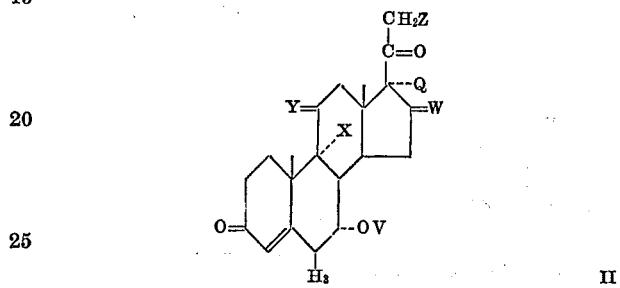

wherein V is a member selected from the group consisting of hydrogen and an acyl radical of an acid selected from the group consisting of a hydrocarbon carboxylic acid having up to eight carbon atoms, and a hydrocarbonsulfonic acid having up to 7 carbon atoms;
X is a member selected from the group consisting of hydrogen and a halogen having an atomic weight less than 100;
Y is a member selected from the group consisting of hydrogen, oxygen, (H,βOH), (H,β halogen of atomic weight less than 100) provided X is halogen, (H,αOV') provided X is hydrogen, V' being a member selected from the group consisting of hydrogen and an acyl radical of a hydrocarbon sulfonic acid having up to 7 carbon atoms, and Y and X taken together are members selected from the group consisting of a 9(11)-dehydro bond and a 9β,11β-epoxy group;
and wherein Q, W, and Z are as defined hereinabove for Formula I.

Typical intermediates of Formula II include compounds such as:

6β-azido - 7α - hydroxy - 16 - methylene - 17α - acetoxyprogesterone (i.e. 6β-azido - 7α - hydroxy - 16 - methylene - 17α - acetoxy - 4,6 - pregnadiene-3,20-dione), the 7-acetate ester thereof, the 7-methanesulfonate ester thereof and the 7-p-toluenesulfonate ester thereof:
6β-azido - 7α - hydroxy - 16 - ethylidene - 17α - acetoxy-4,6 - pregnadiene - 3,20 - dione and the 7α - acetate ester thereof;
6β-azido - 7α - hydroxy - 9α,11β - dichloro - 16α,17α-isopropylidenedioxy - 4,6 - pregnadiene - 3,20 - dione and the 7α-acetate ester thereof;
6β-azido - 7α,17α - bis - hydroxy - 9α,11β - dichloro-21-fluoro - 4,6 - pregnadiene - 3,20 - dione and the 7α-acetate ester thereof; and
6β-azido - 7α,17α - bis - hydroxy - 21 - fluoro - 4,6-pregnadiene - 3,11,20 - trione and the 7α - acetate ester thereof.

GENERAL DESCRIPTION OF ONE PROCESS ASPECT FOR THE PREPARATION OF 6-AZIDO-6-DEHYDOPROGESTERONES

The 6-azido - 6 - dehydroprogesterones of our invention (e.g. 6-azido - 16 - methylene - 17α - acetoxy - 6-dehydroprogesterone) are conveniently prepared from the corresponding 6α,7α-oxidoprogesterone (e.g. 6α,7α-oxido-16-methylene - 17α - acetoxyprogesterone) via re-

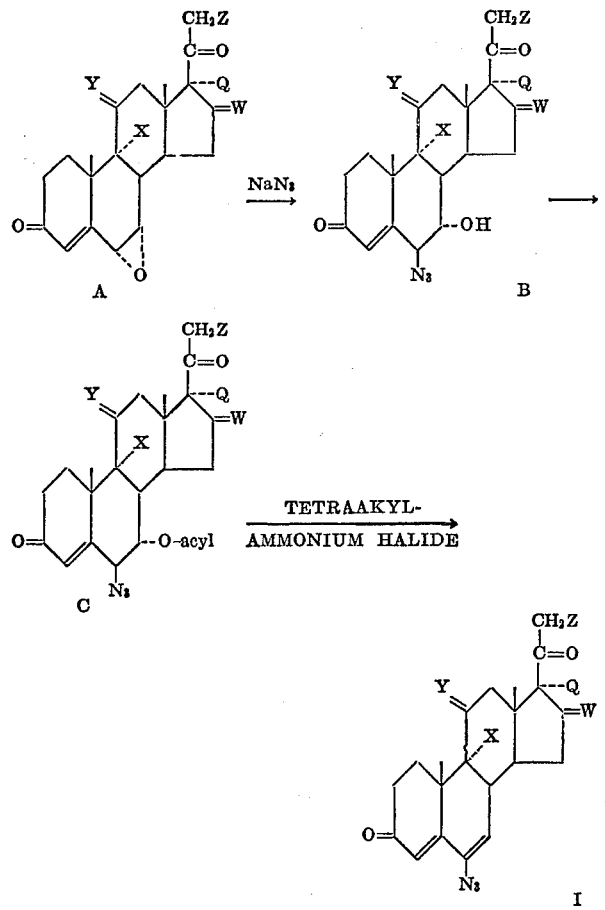

CHART A

According to our process, a 6α,7α - oxido-9α-X-11β-Y-16-W-17α-Q-21-Z-4-pregnene - 3,20 - dione (Formula A) (e.g. 6α,7α - oxido - 16 - methylene - 17α - acetoxy-4-pregnene - 3,20 - dione) is treated with an alkali metal azide (e.g. sodium azide) in a non-reactive, organic solvent, preferably a solvent mixture in which water is present (e.g. aqueous methanol, aqueous dioxane, aqueous dimethylformamide, aqueous methanol/dioxane, aqueous tetrahydrofuran, and the like) under mild conditions in neutral or slightly acidic or basic media whereby the epoxy function is split and there is introduced into the molecule a 6β-azido - 7α - hydroxy system to form a novel intermediate of our invention, i.e. a 6β-azido - 7α - hydroxy - 4 - pregnene of Formula B (e.g. 6β-azido-7α-hydroxy-16-methylene-17α-acetoxy-4-pregnene-3,11-dione.

The 7α-hydroxy function in the thereby formed 6β-azido-7α-hydroxy-9α - X - 11β - Y-16-W-17α-Q-21-Z-4-pregnene-3,20-dione (Formula B) (e.g. 6β-azido-7α-hydroxy-16-methylene-17α-acetoxy-4-pregnene-3,11 - dione) is then esterified utilizing known esterification procedures (e.g. that utilizing acetic anhydride in pyridine). Treatment of the resulting 6β-azido-7α-acyloxy-9α-X-11β-Y-16-W-17α-Q-21-Z-4-pregnene-3,20-dione (Formula C), a novel intermediate of our invention (e.g. 6β-azido-7α-acetoxy-16-methylene-17α - acetoxy - 4 - pregnene-3,20-dione) with a tetraalkylammonium halide (e.g. tetramethylammonium fluoride) in an aprotic solvent, preferably acetonitrile or dimethylformamide, yields a pharmacologically active 6-azido-9α-X-11β-Y-16-W-17α-Q-21-Z-4,6-pregnadiene-3,20-dione of our invention (Compound I), e.g. 6-azido-16-methylene - 17α - acetoxy-4,6-pregnadiene-3,11-dione.

Our process provides a convenient, novel method of converting, in good yields, a 6α,7α-epoxy-4-pregnene to the novel, pharmacologically active 6-azido-4,6-pregnadienes of our invention. Heretofore, it has been unknown to deacetoxylate a 6-substituted - 7α - acyloxy-4-pregnene with a tetraalkylammonium halide to obtain a 6-substituted-4,6-pregnadiene. We have found, however, that when a 6β-azido-7α-acyloxy-4-pregnene-3,20-dione of Formula II (or Formula C hereinabove) is treated with a tetraalkylammonium halide (e.g. tetramethylammonium fluoride) in an aprotic solvent according to a process aspect of our invention, there is formed, in good yield, a 6-azido-4,6-pregnadiene of Formula I.

In carrying out the first step of the aforedescribed process whereby a 6α,7α-oxido-4-pregnene-3,20-dione of Formula A is converted to a 6β-azido-7α-hydroxy-4-pregnene-3,20-dione of Formula B, the alkali metal azide reagent of choice is sodium azide, although there may be used other alkali metal azides such as potassium azide, lithium azide; alternatively, there may also be used quaternary ammonium azides such as tetrabutylammonium azide.

The solvents used in the epoxide splitting step may be any non-reactive, organic solvent in which the steroidal starting compound and the azide reagent are soluble. By non-reactive, organic solvent is meant an organic solvent which will not react with an alkali metal azide or the steroid substrate under the conditions of the reaction so as to cause transformations which will result in the occurrence of competing side reactions. Included among the non-reactive organic solvent contemplated for the epoxide opening are hydroxylated hydrocarbons (e.g. methanol and tertiary butanol), cyclic ethers (e.g. dioxane) and N,N-dialkyl amides (e.g. dimethylformamide).

The epoxide-splitting step is carried out under mild conditions, usually at temperatures ranging from about 0° C. to about 55° C. and preferably at room temperature, with the reaction media usually being maintained at about neutrality (e.g. utilizing dimethylformamide and sodium azide) or slightly basic (e.g. utilizing methanol with sodium azide) or slightly acidic (e.g. utilizing dioxane and methanol as solvent together with a small quantity of aqueous lower alkanoic acid or, alternatively of aqueous boric acid). When carrying out this step on a compound of Formula A having primary or secondary ester groups, e.g. compounds wherein W is (H,α-acyloxy), in order to minimize hydrolysis of the ester function, the epoxide opening step is advantageously carried out in the presence of acid, preferably an acid having the same acyl function as that in the ester groups in the starting steroid A. Thus, 6α,7α-oxido - 16α,17α - diacetoxyprogesterone upon treatment with sodium azide in aqueous methanol/dioxane to which a few milliliters of acetic acid are added yields a 16α,17α-diacetoxy of Formula B, e.g. 6β-azido-7α-hydroxy-16α,17α-diacetoxyprogesterone. Alternatively, when carrying out this step on a compound of Formula A having an alkylidenedioxy function (i.e. 16,17-alkylidene derivatives of compounds wherein Q and W are hydroxy) in order to minimize hydrolysis of the alkylidenedioxy function, the epoxide opening step is advantageously carried out under essentially neutral or slightly basic conditions. Thus, 6α,7α-oxido-16α,17α-isopropylidenedioxy-4-pregnene-3,20-dione (compound of Formula A) upon treatment with sodium azide in aqueous methanol/dioxane yields a 16α,17α-alkylidenedioxy derivative of Formula B, 6β-azido-7α-hydroxy-16α,17α-isopropylidenedioxy-4-pregnene-3,20-dione.

In a preferred procedure of carrying out the epoxide opening step of our processes for preparing 6-azido-4,6-pregnadienes there is usually added to a solution of the 6α,7α-oxido-4-pregnene-3,20-dione (A) in a non-reactive solvent or solvent mixture (e.g. methanol-dioxane mixture) at least one mole of alkali metal azide per mole of steroid (preferably 10 to 12 moles of azide per mole of steroid) in a minimum of aqueous lower alkanoic acid, e.g. acetic acid (usually about 100 ml. water and about 1 ml. acetic acid per mole alkali metal azide) and the reaction mixture is allowed to stand at room temperature until all the starting material is transformed as determined by thin layer chromatography (usually about 17 hours). The desired 6β-azido-7α-hydroxy thereby formed (B) is then conveniently isolated by pouring the reaction mixture into water, extracting the aqueous mixture with an organic solvent, evaporating the combined organic extracts to a residue comprising a 6β - azido-7α-hydroxy-4-pregnene-3,20-dione of Formula B (also a compound of Formula II). Purification is effected utilizing known technique including crystallization and thick layer chromatography.

The esterification step of our process (i.e. B→C) is usually carried out in basic media, under relatively mild conditions known to esterify secondary hydroxyl groups. Preferably, the esterification is carried out at room temperature in pyridine utilizing large molar excesses of acylating agents which may be an acid halide of an aryl carboxylic acid (e.g. benzoyl chloride) or of a hydrocarbon-sulfonic acid (e.g. p-toluenesulfonyl chloride or methanesulfonyl chloride) or an acid anhydride of a lower alkanoic acid having up to eight carbon atoms. In a preferred procedure for carrying out this step whereby the 7α-hydroxy function is esterified, whenever starting steroid (B), already possesses an ester function, the acylating agent used is preferably one having the same acyl radical as that in the starting steroid (B) (e.g. acetic anhydride when the starting steroid (B) is 6β-azido-7α-hydroxy-17α-acetoxy-4-pregnene-3,20-dione.

The last step of our process whereby a 6β-azido-7α-acyloxy-4-pregnene-3,20-dione (C) upon treatment with a tetraalkylammonium halide is converted to a 6β-azido-21-oxygenated-4,6-pregnadiene-3,20-dione (I), is usually carried out in an aprotic solvent at temperatures in the range of from about 0° C. to about 80° C., preferably between 20° C. to about 60° C.

Although anhydrous conditions are usually employed for this last deacyloxylating step of our process, water may be present in small amounts, and there will be formed the desired 6-azido-4,6-pregnadiene.

Thus, treatment of 6β-azido-7α,17α-diacetoxy-4-pregnene-3,20-dione in acetonitrile with tetramethylammonium fluoride pentahydrate yields 6-azido-4,6-pregnadiene-17α-acetoxyprogesterone in good yield.

Aprotic solvents suitable for use in our process include dimethylsulfoxide, dimethylacetamide, dioxane, tetrahydrofuran, and preferably acetonitrile or dimethylformamide.

Tetraalkylammonium halides are known in the art. In our process, we have found it most convenient to use tetramethylammonium chloride or, preferably, tetramethylammonium fluoride, since they are commercially available and excellent product yields are obtained thereby. When utilizing the commercially available tetramethylammonium fluoride pentahydrate as reagent, usually the water of hydration is removed therefrom by azeotropic distillation with acetonitrile although the reaction will proceed when the pentahydrate is used as reagent. When preparing the anhydrous form of the tetramethylammonium fluoride reagent, the azeotropic distillation is continued until the reagent is a solid at 50° C., at which point it is most suitable for use as a deacyloxylating reagent to convert a 6β-azido-7α-acyloxy-4-pregnene-3,20-dione to a 6-azido-4,6-pregnadiene-3,20-dione (I) of our invention.

The tetraalkylammonium halide reagents have limited solubility in the aprotic solvents utilized in this process; therefore, it is preferable to stir the reaction mixture when deacyloxylating at C-7 (6). The reaction will proceed without stirring, however, with the tetraalkylammonium halide dissolving as the reaction proceeds.

Generally, when deacyloxylating a 6β-azido-7α-acyloxy-4-pregnene-3,20-dione of Formula C, the 6β-azido-7α-acyloxy intermediate (C) is added (either in the solid state or in solution) to a solution or suspension of tetraalkylammonium halide (present in quantities ranging from 1.5 moles to 5 moles per mole of steroid) in an aprotic solvent (of which 1 ml. per 10 mgm. of reagent is generally used). The reaction is stirred or left standing in temperatures ranging between 0° C. to 80° C. until the deacyloxylation at C-7 (6) is completed as evidenced by thin layer chromatography or by spectroscopic evaluation. (Reaction times usually range from 10 minutes to 48 hours.) The resulting 6-azido-4,6-pregnadiene-3,20-dione of Formula I is isolated utilizing known techniques. Usually, the solvent is partially or totally removed in vacuo, then an organic solvent (e.g. methylene chloride, chloroform, ethyl acetate, and the like) is added, the solution poured into water, the layers separated, the organic layer washed with dilute aqueous base (e.g. sodium bicarbonate), dried and evaporated to a residue comprising the desired 6-azido-9α-X-11-Y-16-W-17α-Q-4,6-pregnadiene - 3,20 - dione of Formula I. Purification of this product is effected by known techniques including chromatography and recrystallization methods.

In our process whereby a 6α,7α-oxido-4-pregnene-3,20-dione is converted via three steps to a 6-azido-4,6-pregnadiene-3,20-dione, the necessary 6α,7α-oxido-4-pregnene-3,20-dione starting compounds (A) are conveniently prepared according to known procedures from the corresponding 6,7-unsubsituted-4,6-pregnadiene-3,20-dione such as by reaction with a peracid in a non-reactive organic solvent, e.g. with reagent-solvent combinations such as meta-chloroperbenzoic acid in acetone, meta-chloroperbenzoic acid in methylene chloride/tert.-butanol, or with mono-perphthalic acid in chloroform. In turn, the 6,7-unsubstituted-4,6-pregnadiene-3,20-dione precursors are conveniently derived from the corresponding 6,7-dihydro analogs by procedures known to effect dehydrogenation between C-6 and C-7, such as those utilizing chloranil or 2,3-dichloro-5,6-dicyanobenzoquinone (DDQ). When the starting steroid has a 16-alkyl substituent, e.g. 16β-methyl-4-pregnene-3,20-dione, in order to minimize the possibility of rearrangement reactions, introduction of the 6-dehydro bond is preferentially effected by the use of 2,3-dichloro-5,6-dicyanobenzoquinone in the presence of acid (e.g. DDQ in ethyl acetate and acetic acid).

When preparing the 6-azido-4,6-bis-dehydropregnanes of our invention (i.e. the 6-dehydro analogs of Formula I) by the above described process, it is usually preferable to have present in the starting 6α,7α-epoxypregnane (A) all the substituents desired in the final 6-azido-4,6-pregnadiene product, I. Thus, the preferred embodiment of the composition-of-matter aspect of our invention, i.e. the 6-azido-16-lower alkylidene-17α-lower alkanoyloxy-6-dehydroprogesterones, may be prepared by this process aspect of our invention, utilizing as starting compounds 6α,7α-epoxy intermediates of Formula A in which the 16-lower alkylidene-17α-lower alkanoyloxy substituents are present which are derived from the corresponding 6β-chloro-7α-acyloxy-16-lower alkylidene-progesterone derivative (e.g. 6β-chloro-7α,17α-diacetoxy-16-methyleneprogesterone) by reaction with alkaline aqueous alkanol (e.g. aqueous methanolic sodium hydroxide). In turn, the 6β-chloro-7α-acyloxy-16-lower alkylideneprogesterone precursors are prepared utilizing procedures known in the art. Specifically, a 16-lower alkyl-4,6,16-pregnatriene-3,20-dione (e.g. 16 - methyl - 4,6,16 - pregnatriene - 3,20-dione) when treated with at least two moles of an aromatic peracid (preferably meta-chloroperbenzoic acid) in a non-reactive organic solvent (e.g. benzene, methylene chloride or tertiary butanol) will yield a 6α,7α;16α,17α-bis-oxido derivative (e.g. 6α,7α;16α,17α-bis-oxido - 16β - methyl-4-pregnene-3,20-dione) which upon treatment with at least two moles of hydrogen chloride in a lower alkanoic acid (e.g. acetic acid) results in fission of both epoxide functions to yield a 6β-chloro-7α,17α-dihydroxy-16-lower alkylideneprogesterone derivative (e.g. 6β-chloro-7α,17α-dihydroxy-16-methyleneprogesterone) which, upon esterification via known techniques for esterifying tertiary alcohols yields the 6β-chloro-7α,17α-diacyloxy-16-lower alkylideneprogesterone precursor (e.g. 6β-chloro-7α,17α-diacetoxy-16-methyleneprogesterone for the requisite 6α,7α-oxido starting compound of our process as set forth in Chart A.

In the aforementioned esterification step in the preparation of the 6β-chloro-7α-alkanoyloxy-precursor of the 6α,7α-oxido starting compound of this process, the choice of acylating agent used will depend upon the ester desired at C–17 of the 6-azido-16-lower alkylidene-6-dehydro compound of our invention. Thus, when preparing 6-azido-16-methylene-17α-valeroxy - 6 - dehydroprogesterone according to the process described hereinabove, the necessary 6α,7α-epoxy-starting compound (e.g. 6α,7α-oxido-16-methylene - 17α - valeroxyprogesterone) is prepared by reacting 16-methyl - 4,6,16 - pregnatriene-3,20-dione with m-chloroperbenzoic acid in tertiary butanol followed by treatment of the resulting 6α,7α;16α,17α-bis-oxido-16-methyl - 4 - pregnane - 3,20 - dione with hydrogen chloride in acetic acid, thence esterification of the 6β - chloro - 7α,17α - dihydroxy - 16 - methyleneprogesterone thereby formed with valeric acid in the presence of p-toluenesulfonic acid and trifluoroacetic anhydride to obtain 6β-chloro-7α,17α-divaleroxy - 16 - methyleneprogesterone which, upon treatment with sodium hydroxide in aqueous methanol, will prepare the necessary 6α,7α-epoxy starting compound, i.e. 6α,7α-oxido-16-methylene-17α-valeroxyprogesterone.

Alternatively the 6-azido-16-lower alkylidene-17α-lower alkanoyloxy - 6 - dehydroprogesterones of our invention (e.g. 6 - azido-16-ethylidene-17α-propionoxy-4,6-pregnadiene-3,20-dione) are also prepared via our process as shown in Chart A, but utilizing as starting compound a 6α,7α;16α,17α-bis-oxido-16β-lower alkyl-4-pregnene-3,20-dione (e.g. 6α,7α;16α,17α-bis-oxido-16β-ethyl-4-pregnene-3,20-dione) which are prepared as described hereinabove. In this species of our process, the 6α,7α;16α,17α-bis-oxido-16β-lower alkyl-4-pregnene-3,20-dione starting compound is a compound of Formula A, Chart A, wherein W and Q together form the 16β-lower alkyl-16α,17α-oxido functions (shown hereinbelow in Chart B as Compound A′) which is converted to a 6-azido-16-lower alkylidene-17α-lower alkanoyloxy-6-dehydroprogesterone as shown in Chart B below via flow diagram wherein substituents X, Y, and Z are as defined hereinabove for Formula I; T′ being H and lower alkyl:

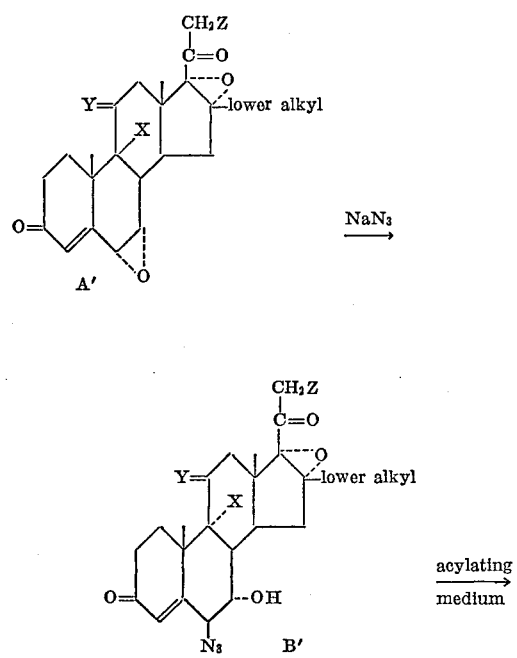

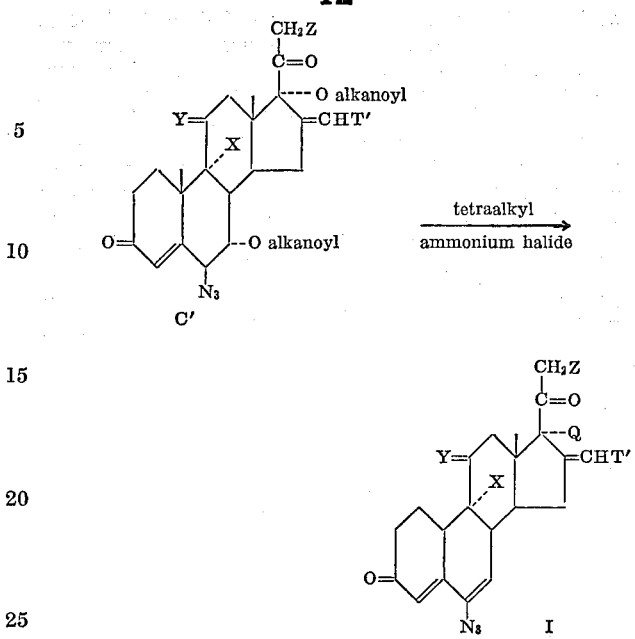

CHART B

By this species of our process, a 9α-X-11β-Y-6α,7α; 16α,17α-bis-oxido - 16β - lower alkyl - 4 - pregnene-3,20-dione (Formula A′) (e.g. 6α,7α;16α,17α-bis-oxido-16β-ethyl-4-pregnene-3,20-dione) is treated with an alkali metal azide (e.g. sodium azide) in an aqueous organic solvent (e.g. aqueous methanol, aqueous dioxane, aqueous dimethylformamide, aqueous methanol/dioxane and the like) at room temperature to obtain a 9α-X-11-Y-6β-azido-7α-hydroxy-16β-lower alkyl - 16α,17α-oxido-4-pregnene-3,20-dione (Formula B′) (e.g. 6β-azido-7α-hydroxy-16β-ethyl-16α,17α-oxido-4-pregnene-3,20-dione). When a compound of Formula B′ is subjected to esterification conditions known to esterify tertiary alcohols, e.g. is treated with an acid-acid anhydride mixture of the group consisting of a lower alkanoic acid and the corresponding acid anhydride (e.g. propionic acid and propionic anhydride), an anhydride of a lower alkanoic acid with a strong organic acid (e.g. propionic acid anhydride and p-toluenesulfonic acid), or a lower alkanoic acid with an anhydride of a strong organic acid wherein the pKa of said strong acid is at most equal to the pKa of said lower alkanoic acid (e.g. propionic acid and trifluoroacetic anhydride) the 7α-hydroxy group at C–7 in intermediate B′ is esterified and the 16α,17α-oxido is split with formation of the alkylidene-17α-alkanoyloxy groups and there is obtained 9α-X-11-Y-6β-azido-7α,17α-bis-lower alkanoyloxy-16-methyleneprogesterone derivative (Formula Q) (e.g. 6β - azido-7α,17α-dipropionoxy-16-ethylideneprogesterone) together with some isomeric 15-dehydro-16-lower alkyl-17α-lower alkanoyloxy derivative (e.g. 6β-azido-7α,17α - dipropionoxy-16-ethyl-15-dehydroprogesterone). Reaction of a 6β-azido-7α-acyloxy derivative of Formula C with a tetraalkylammonium halide (e.g. tetramethylammonium fluoride) according to our process in an aprotic solvent (preferably acetonitrile or dimethylformamide) yields a 9α-X-11-Y-6-azido-16-lower alkylidene-17α-lower alkanoyloxy-6-dehydroprogesterone of Formula I (e.g. 6-azido-16-ethylidene-17α-propionoxy-4,6-pregnadiene-3,20-dione).

The process step B′→C′ whereby a 7α-hydroxy function is esterified and a 16β-alkyl-16α,17α-oxido function is converted to a 16-alkylidene-17α-acyloxy derivative, is generally carried out under anhydrous conditions and in an inert atmosphere such as argon or nitrogen. Although any inert solvent such as benzene, toluene, xylene and the like may be used, the preferred solvent is the lower alkanoic acid corresponding to the desired ester at C–17. Thus, acetic acid is preferred when a 17-acetate is desired and caproic acid is preferred when a 17-caproate is to be prepared.

In both species shown hereinabove in Charts A and B, there are three steps, the first of which involves the conversion of a 6α,7α-epoxyprogesterone derivative (i.e. derivatives A and A') to a 6β-azido-7α-hydroxyprogesterone derivative (derivatives B and B'), followed by an esterification step to obtain a 6β-azido-7α-acyloxyprogesterone (i.e. derivatives C and C') and thence the final deacyloxylation step at C-7 (6) to obtain a 6-azido-6-dehydroprogesterone (I) of our invention.

The method of Chart B is convenient when preparing a 16-alkylidenes progesterone of Formula I wherein O is lower alkanoyloxy since the 6α,7α;16α,17α-bis-oxido starting compound (A') for this method is prepared in one step from a 6,16-bis-dehydro precursor, whereas four steps are required to prepare the 6α,7α-oxido-16-lower alkylidene-17α-lower alkanoyloxy starting compounds (A) from the same precursor for the method of Chart A.

Alternatively, another method for preparing both the 17α-hydroxy and 17α-alkanoyloxy-16-lower alkyidene-4,6-pregnadienes of our invention utilizes intermediate B' as starting compound as shown below in Chart C wherein R is a hydrocarbon and wherein T, X, Y, and Z are as defined hereinabove for Formula I.

Alternatively, another method for preparing both the 17α-hydroxy and 17α-alkanoyloxy-16-lower alkylidene-4,6-pregnadienes of our invention utilizes intermediate B' as starting compound as shown below in Chart C wherein R is a hydrocarbon and wherein X, Y, and Z are as defined hereinabove for Formula I; T' being hydrogen and lower alkyl:

diene-3,20-dione) which, when subjected to esterification conditions known to esterify tertiary alcohols, e.g. by treatment with a mixture of acetic acid, p-toluenesulfonic acid and trifluoroacetic anhydride, yields a 6-azido-16-alkylidene-17α-acyloxy compound of Formula I (e.g. 6-azido-16-methylene-17α-acetoxy - 4,6 - pregnadiene-3,20-dione). Alternatively, treatment of intermediate D with hydrobromic acid in acetic acid according to known methods will yield a 16-alkylidene-17α-hydroxy compound of Formula I (e.g. 6-azido-16-methylene-17α-hydroxy-4,6-pregnadiene-3,20-dione).

When intermediate B' is first treated with hydrobromic acid in acetic acid at room temperature, the 16β-alkyl-16α,17α-oxido function is converted to 16-alkylidene-17-hydroxy groups to form a 6β-azido-7α-sulfonyloxy intermediate C (e.g. 6β-azido-7α-methanesulfonyloxy-16-methylene-17α-hydroxy-4,6-pregnadiene-3,20 - dione). Treatment of the foregoing with tetramethylammonium halide yields a 16-alkylidene-17α-hydroxy compound of Formula I (e.g. 6-azido-16-methylene-17α-hydroxy-4-pregnene-3, 20-dione).

When preparing 6-azido-6-dehydro progesterones from a 6α,7α-oxido progesterone according to our process as set forth in Charts A and B, substituents such as those at C-9 and at C-11 may be introduced into the molecule during the process, preferably after the formation of the 6β-azido-7α-acyloxy-pregnane intermediate (C and C'). Thus, a 9(11)-dehydro intermediate is prepared utilizing known procedures preferably before formation of the 6-azido-6-dehydro-system and after the epoxidation at C-6 and 7, and usually after preparation of the 6β-azido-7α-acetoxypregnane intermediate (C and C'). Thus, an 11-

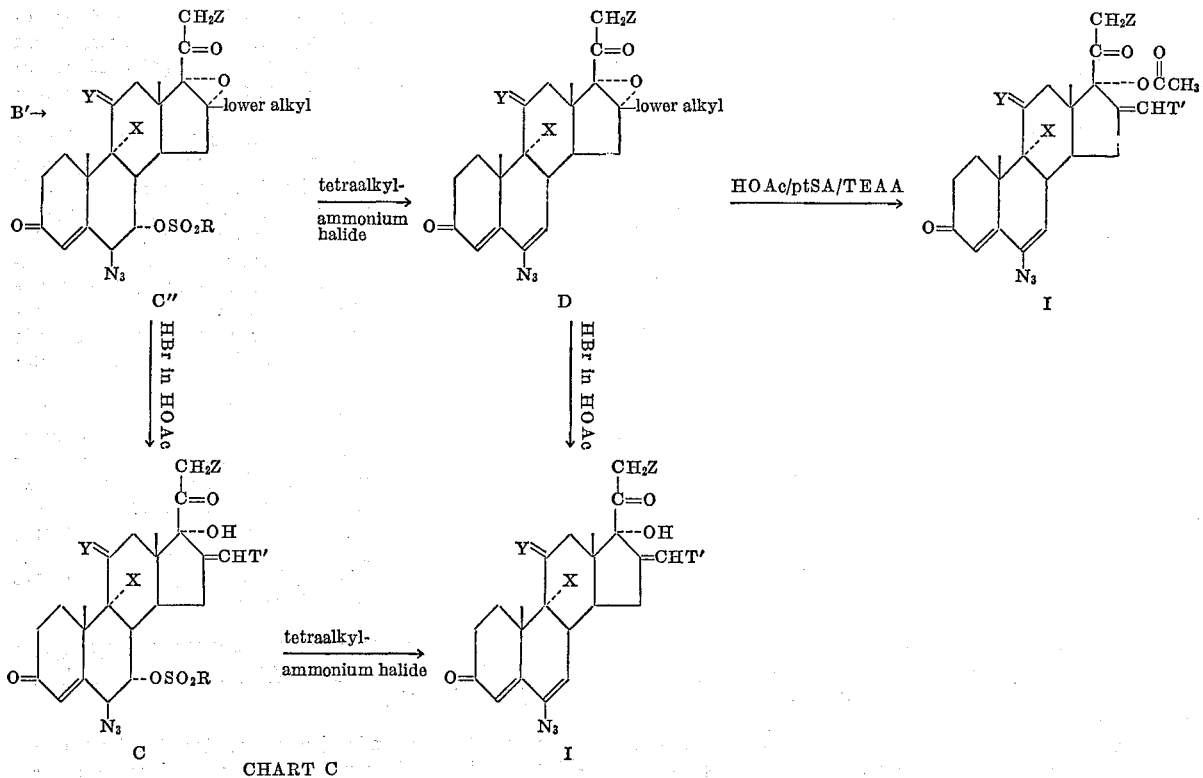

CHART C

By this species of our process, a 6β-azido-7α-hydroxy-16β-lower alkyl-4-pregnene of Formula B' (e.g. 6β-azido-7α-hydroxy-16β-methyl-16α,17α - oxido-4-pregnene-3,20-dione) is treated with a hydrocarbonsulfonyl chloride in pyridine at room temperature to obtain the corresponding 7α-sulfonyloxy ester intermediate C" (e.g. 6β-azido-7α-methanesulfonyloxy - 16β - methyl - 16α,17α - oxido - 4-pregnene-3,20-dione) which, upon treatment with tetramethylammonium fluoride yields the corresponding 6-azido-16β-lower alkyl-16α,17α-oxido-6-dehydro-intermediate D (e.g. 6-azido-16β-methyl-16α,17α-oxido-4,6-pregnahydroxyl group is introduced microbiologically with the aid of microorganisms such as Curvularia lunata (N.R.R.L. 2380) or Rhizopus nigricans (A.T.C.C. 6227b). When Curvularia lunata is employed, the 11β-hydroxy steroid produced is dehydrated by a reagent such as methanesulfonyl chloride in the presence of pyridine or phosphorous oxychloride in pyridine or N-bromoacetamide and sulfur dioxide in pyridine to give the 9 (11)-dehydro intermediates. Alternatively, the action of Rhizopus nigricans on progesterone yields the 11α-hydroxy derivatives, 11α-hydroxy progesterone, i.e. -4-pregnane-11α-ol-3,20-dione. Subsequent-treatment with a sulfonyl chloride such as methanesulfonyl chloride yields the corresponding 11α-sulfonate, i.e. 11α-methanesulfonyloxy-4-pregnene-3,20-dione. To minimize the possiblity of competing side reactions, the first two steps in our process (as shown in Charts A and B) for introduction of the 6-azido-6-dehydro-system are carried out with the 11α-sulfonyloxy-derivative. Thus, treatment of 11α-methanesulfonyloxy-4-pregnene-3,20-dione with chloranil followed by epoxidation of the 6-dehydro analog thereby formed, i.e. 11α - methanesulfonyloxy-4,6-pregnadiene-3,20-dione with monoperphthalic acid, for example, yields 6α,7α-oxido - 11α - methanesulfonyloxy-4-pregnene-3,20-dione which, upon treatment with sodium azide yields 6β-azido-7α - hydroxy - 11α-methanesulfonyloxy-4-pregnene-3,20-dinoe. Esterification at C-7 utilizing acetic anhydride in pyridine yields 6β-azido-7α-acetoxy-11α-methanesulfonyloxy - 4-pregnene-3,20-dione. Introduction of the 9(11)-bond is conveniently carried out in the foregoing 11α-methanesulfonate by treatment with sodium acetate in acetic acid to yield 6β-azido-7α-acetoxy-4,9(11)-pregnadiene-3,20-dione.

After formation of the 9(11)-dehydro intermediate, halogen groups may then be introduced at C-9 and C-11 of the 6β - azido - 7α-acetoxy-4,9(11)-pregnadiene-3,20-dione, e.g. to form a 9α,11β-dichloro derivative employing procedures well-known in the art. For example, treatment of the aforenamed 9(11)-dehydropregnane with chlorine in halogenated solvents such as methylene chloride will yield the 9α,11β-dichloro intermediates, 6β-azido-7α - acetoxy-9α,11β-dichloro-4-pregnene-3,20-dione which upon treatment with tetramethylammonium fluoride will yield 6-azido-9α,11β-dichloro-4,6-pregnadiene-3,20-dione, a 6-dehydro compound of Formula I. If a 9α-bromo-11β-fluoro- or a 9α-chloro-11β-fluoro-derivative is desired, the 6β - azido-7α-acyloxy-9(11)-dehydro precursor is treated with N-bromosuccinimide and hydrogen fluoride or N-chlorosuccinimide and hydrogen fluoride, respectively, to obtain the corresponding 9α,11β-dihalogeno derivative, i.e. 6β - azido-7α-acetoxy-9α-bromo-11β-fluoro-4-pregnene-3,20-dione and 6β-azido-7α-acetoxy-9α-chloro-11β-fluoro-4-pregnene - 3,20-dione, respectively. Treatment of each of the foregoing 6β - azido-7α-acetoxy intermediates with tetramethylammonium fluoride according to the above described process yields 6 - azido-6-dehydro-9α,11β-dihalogeno derivatives of Formula I, e.g. 6-azido-9α-bromo-11β-fluoro-4,6-pregnadiene-3,20-dione and 6-azido-9α-chloro-11β-fluoro-4,6-pregnadiene-3,20-dione respectively.

The 6β - azido-7α-acetoxy-9(11)-dehydropregnanes are also useful in the preparation of the 9α-halogeno-11β-hydroxy derivatives of our invention. Thus, a 6β-azido-7α-acetoxy-pregnane, e.g. 6β - azido-7α-acetoxy-49(11)-pregnadiene-3,20-dione upon treatment with N-bromoacetamide in aqueous dioxane in the presence of perchloric acid according to known procedures yields the corresponding 9α - bromo - 11β - hydroxy derivative, e.g. 6β-azido-7α-acetoxy-9α-bromo-11β-hydroxy-4-pregnene-3,20-dione.

Other 9α - halogeno-11β-hydroxy-6β-azido-7α-acetoxy-21-oxygenated-pregnane intermediates, i.e. the 9α-chloro- and 9α-fluoro-, are obtained from the corresponding 9β,11β - oxido derivatives, e.g. 6β-azido-7α-acetoxy-9β,11β-oxido - 4-pregnene-3,20-dione which, in turn, are derived from the aforedescribed 9α-bromo-11β-hydroxy intermediates, e.g. 6β-azido-7α-acetoxy-9α-bromo-11β-hydroxy-4-pregnene-3,20-dione, by treatment with potassium acetate in ethanol or acetone. Addition of hydrogen chloride in chloroform, or of hydrogen fluoride in chloroformtetrahydrofuran, to a 9β,11β-oxido pregnane intermediate, e.g. 6β - azido-7α-acetoxy-9β,11β-oxido-4-pregnene-3,20-dione, will yield the corresponding 9α-chloro-11β-hydroxy- or 9α-fluoro - 11β-hydroxy-pregnane intermediates, respectively, e.g. 6β - azido-7α-acetoxy-9α-chloro-4-pregnene-11β-ol-3,20-dione and 6β - azido-7α-acetoxy-9α-fluoro-4-pregnene-11β-ol-3,20-dione.

By utilizing the above procedures it is obvious that one need but choose the appropriate 6β - azido-7α-acetoxy-9(11)-dehydro-intermediate to obtain other 9α-halogeno-11β - hydroxy-6β-azido-7α-acetoxy-pregnane intermediates of our invention. The 6β-azido-7α-acyloxy-9α,11β-dihalogeno-pregnanes and the 6β-azido-7α-acyloxy-9α-halogeno-11β - hydroxy-pregnane intermediates prepared from the corresponding 6β - azido-7α-acyloxy-9(11)-dehydropregnanes as described hereinabove are then converted to the corresponding 6-azido-4,6-pregnadienes of our invention by treatment with a tetraalkylammonium halide in acetonitrile. Thus, each of 6β - azido-7α-acetoxy-9α-bromo-4-pregnene - 11β-ol-3,20-dione, 6β-azido-7α-acetoxy-9α-chloro-4-pregnene-11β-ol-3,20-dione and 6β-azido-7α-acetoxy-9α-fluoro-4,6-pregnadiene-11β-ol-3,20-dione and the 16 (α and β)-methyl honologs thereof upon treatment with tetramethylammonium fluoride in acetonitrile yields the corresponding 6-azido-9α-halogeno-11β-hydroxy-4,6-pregnadiene of our invention, e.g. 6-azido-9α-bromo-4,6-pregnadiene - 11β-ol-3,20-dione, 6-azido-9α-chloro-4,6-pregnadiene-11β-ol-3,20-dione, and 6-azido-9α-fluoro-4,6-pregnadiene-11β-ol-3,20-dione, respectively, and the 16 (α and β)-methyl homologs thereof.

When the starting 6β-azido-7α-acetoxy-4-pregnane has a 9α-bromo-11β - hydroxy group, treatment with tetramethylammonium halide according to our process will cause the formation of a mixture of products including some 9β,11β - oxido-4,6-pregnadiene. Separation of the product mixture may be effected via chromatographic procedures. Thus, treatment of 6β-azido-7α-acetoxy-9α-bromo-11β - hydroxy-4-pregnene-3,20-dione with tetramethylammonium fluoride in acetonitrile yields a mixture of 6-azido-9α-bromo-11β - hydroxy-4,6-pregnadiene-3,20-dione together with some 6-azido-9β-11β-oxido-4,6-pregnadiene-17α,21-diol-3,20-dione which, when separated on a thick layer preparative plate with silica gel yields mainly 6 - azido-9α-bromo-11β-hydroxy-4,6-pregnadiene-3,20-dione.

The 9α-halogeno-11-keto-pregnanes of Formula I may be obtained from the 9α-halogeno-11β-hydroxypregnanes by oxidation of the 11-hydroxy function such as with chromic acid. Alternatively, the 6-azido-9α-halogeno-11-keto-4,6-pregnadienes may be obtained from the 6α,7α-oxido-4-pregnene-precursor according to the process described hereinabove. Thus, 6-azido-9α-fluoro-4,6-pregnadiene-3,11,20-trione is formed upon oxidation of 6-azido-9α-fluoro-4,6-pregnadiene-11β-ol-3,20-dione with chromic acid. Alternatively, this 9α-fluoro-11-ketopregnane is derived from 6α,7α-oxido-9α-fluoro-4-pregnene-3,11,20-trione which upon treatment with sodium azide in dilute acetic acid is converted to the corresponding 6β-azido-7α-hydroxy intermediate, i.e. 6β-azido-7α-hydroxy-9α-fluoro-4-pregnene-3,11,20 - trione, which after esterification at C-7, such as with acetic anhydride in pyridine, followed by treatment of the thereby formed 7α-acetate ester with tetramethylammonium fluoride yields the 6-azido-9α-fluoro-11-keto-4,6-pregnadiene of Formula I, i.e. 6-azido-9α-fluoro-4,6-pregnadiene-3,11,20-trione.

GENERAL DESCRIPTION OF ANOTHER PROCESS ASPECT FOR PREPARATION OF 6-AZIDO-4,6-PREGNADIENES

Preferred compounds of this invention, i.e. the 6-azido-4,6-pregnadiene-3,20-diones of Formula I are also prepared from the 6β-azido-7α-acyloxy-4-pregnene intermediate of the first process aspect (formulae B and C, chart A hereinabove) by reaction of said 6β-azido-7α-hydroxy-4-pregnene of Formula B (Chart A) or the 7α-ester thereof (Formula C, Chart A) with concentrated hydrochloric acid in acetone or preferably, in a solvent mixture comprising a lower alkanoic acid (e.g. acetic acid) and dioxane.

In carrying out the physical embodiment of this process aspect, we have found that concentrated hydrochloric acid is necessary in order to dehydrate at C-6 and C-7.

i.e. to convert the 6β-azido-7α-hydroxy pregnane or 6β-azido-7α-acyloxy pregnane to a 6-azido-6-dehydro pregnane. When other acids are employed such as p-toluenesulfonic acid or sulfuric acid, dehydration does not occur and the 6β-azido-7α-hydroxy (B, Chart A) or 6β-azido-7α-acyloxy starting compound (C, Chart A) is recovered even after several days reaction time.

According to our process, a 6β-azido-7α-hydroxy-9α-X-11β-Y-16-W-17α-Q-21-Z-4-pregnene-3,20 - dione (Formula B, Chart A) or a 7α-acyloxy thereof (Formula C, Chart A) is dissolved in either acetone or preferably a solvent mixture comprising a lower alkanoic acid (usually acetic acid) and dioxane to which concentrated hydrochloric acid is added. The reaction mixture is allowed to remain at room temperature until a thin layer chromatographic analysis of an aliquot of the reaction mixture indicates the absence of a 6β-azido-7α-hydroxy or a 6β-azido-7α-acyloxy intermediate. The reaction time is usually from 24 to 48 hours, although it may take several days to effect completed dehydration in some cases. The resulting 6-azido-4,6-pregnadiene-3,20-dione of Formula I is isolated from the reaction mixture using standard techniques usually by diluting the reaction mixture with a halogenated solvent (e.g. methylene chloride), washing the resulting organic solution with water and aqueous sodium bicarbonate solution, distilling the dried organic solution and purifying the residue via chromatographic techniques.

The 6β-azido-7α-hydroxy - 4 - pregnene-3,20-diones of Formula B, and the 6β-azido-7α-acyloxy-4-pregnene-3,20-diones of Formula C, Chart A, necessary intermediates in this process aspect, are prepared in the same manner as described hereinabove in the section relating to the first process aspect.

In carrying out the physical embodiment of this process aspect whereby a 6α,7α-oxido-4-pregnene-3,20-dione of Formula A is treated with an alkali metal azide in a non-reactive organic solvent and the thereby formed 6β-azido-7α-hydroxy-4-pregnene precursor (Formula A) desirably should possess the substituents (such as at C-9, 11, 16 and 17), which are desired in the 6-azido-4,6-pregnadiene product of Formula I produced thereby. When structural modifications of the pregnane molecule (such as at C-9 or 11) are contemplated, it is usually preferable to utilize as starting compound a 6β-azido-7α-acyloxy-4-pregnene of Formula II (or Formula C) hereinabove and, after carrying out any desired structural modifications on the 7α-acyloxy intermediate, converting the thereby modified steroid (e.g. a 6β-azido-7α-acyloxy-9α-X-11-Y-16-W-17α-Q-21-Z-4-pregnene-3,20-dione of Formula II to the therapeutically active 6-azido-4,6-pregnadiene of Formula I by treatment thereof with concentrated hydrochloric acid or, preferably, with a tetraalkyl ammonium halide according to the first process aspect of our invention.

GENERAL DESCRIPTION OF PROCESS FOR PREPARING 6-AZIDO - 1,4,6 - PREGNATRIENE-3,20-DIONES

The 6-azido-1,4,6-pregnatriene-3,20-diones of Formula I are prepared from the corresponding 6-azido-4,6-pregnadiene-3,20-diones of Formula I by the process aspect of our invention whereby said 6-azido-4,6-pregnadiene in an inert solvent (preferably dioxane) is reacted with 2,3-dichloro-5,6-dicyanobenzoquinone (hereinafter referred to as DDQ) in the presence of a strong acid (preferably hydrochloric acid) and usually also in the presence of water.

According to our process, a 6-azido-4,6-pregnadiene-3,20-dione of Formula I (e.g. 6-azido-16-methylene-17α-acetoxy-4,6-pregnadiene-3,20-dione is treated with an excess (based upon molar ratios) of DDQ in a non-reactive, organic solvent (usually benzene or preferably dioxane) in the presence of a strong acid (e.g. trifluoroacetic, sulfuric or, preferably, hydrochloric acid) advantageously in amounts at least equimolar to the 6-azido-4,6-pregnadiene, and usually also in the presence of water. Whereby is obtained the corresponding triene of Formula I, i.e. 6-azido-16-methylene-17α-acetoxy-1,4,6-pregnatriene-3,20-dione.

The amount of water preferably employed in our process is dependent upon the strong acid catalyst used; with hydrochloric acid as strong acid the presence of from 5% to 10% water in dioxane produces optimum yields when converting 6-azido-16-methylene - 17α - acetoxy-4,6-pregnadiene-3,20-dione at 60° C. to the corresponding 6-azido-1,4,6-pregnatriene. When trifluoroacetic acid is employed as the strong acid, the yields and purity of product obtained are similar whether derived from a reaction mixture containing only a trace of water in dioxane or a reaction mixture containing 10% water in dioxane; however, the reaction rate appears faster with only a trace of water present.

Our reaction is preferably carried out at temperatures in the range of from 60° C. to 80° C. At lower temperatures, the rate of reaction is slower; at higher temperatures, side reactions occur resulting in lower yields of 6-azido-1,4,6-pregnatriene.

Our reaction whereby a 6-azido-4,6-pregnadiene upon treatment with DDQ and a strong acid is converted to a 6-azido-1,4,6-pregnatriene is preferably carried out utilizing concentrated hydrochloric acid as the strong acid. We have found that optimum yields of 6-azido-1,4,6-pregnatriene-3,20-dione with minimum side reactions are obtained from a 6-azido-4,6-pregnadiene-3,20-dione when there is employed from about one to five moles of concentrated hydrochloric acid per mole of steroid and said reaction is carried out at about 60° C. to 80° C. with the aqueous organic solvent being dioxane containing from about 5% to about 10% water and with the concentration of hydrochloric acid and of the steroid in the aqueous dioxane preferably being from about 1% to about 5% by volume.

We have found that when greater or smaller quantities of acid and/or water are used than those falling within the preferred range, the yield of 6-azido-1,4,6-pregnatriene diminishes with a concomitant increase of side product formation. Additionally, when the concentration of hydrochloric acid or of 6-azido-4,6-pregnadiene in the aqueous dioxane reaction mixture falls outside the 1% to 5% by volume range, or when high temperatures, e.g. over 100° C., are employed, lower yields of 6-azido-1,4,6-pregnatriene with lesser purity are obtained.

We have found a convenient water-solvent-acid for use in our process to be one containing about 9.0% water in dioxane and about 0.4% hydrochloric acid (i.e. a solution containing 49.5 ml. dioxane, 0.5 ml. concentrated hydrochloric acid and 5 ml. water). Optimum yields of 6-azido-1,4,6-pregnatriene are obtained by our DDQ dehydrogenation process when a sufficient quantity of the aforementioned aqueous dioxane-hydrochloric acid is added to a 6-azido-4,6-pregnadiene so there is present in the reaction mixture from one to five moles concentrated hydrochloric acid per mole of steroid.

In carrying out the physical embodiment of a preferred method of this process, the reaction mixture comprising a 6-azido-4,6-pregnadiene and hydrochloric acid in aqueous dioxane is usually heated under an inert gas, e.g. nitrogen, at temperatures in the range of from about 60° C. to about 80° C. The dehydrogenation reaction is usually completed in from 30 minutes to about 2 hours as indicated by the absence of 6-azido-4,6-pregnadiene starting compounds as determined by thin layer chromatographic techniques, for example. The 6-azido-1,4,6- pregnatriene thereby formed is isolated via conventional techniques such as pouring the reaction mixture into water, extracting with an organic solvent and separating the products utilizing chromatographic techniques.

Our process is advanageously (although not necessarily) carried out in the absence of oxygen. Aqueous hydrochloric acid is preferred as strong acid catalyst although other strong acids such as sulfuric and trifluoroacetic may also be used, usually in the presence of water.

The 6-azido-1,4,6-pregnatrienes of this invention are not easily formed by the usual methods known in the art. Thus, for example, isolatable quantities of 6-azido-1,4,6-pregnatriene are not obtained when the corresponding 6-azido-4,6-pregnadienes are treated in anhydrous dioxane with DDQ alone or with DDQ in the presence of a weak acid such as benzoic acid, or when subjected to the action of microbiological dehydrogenating agents such as *Corynebacterium simplex* and *Bacillus sphaericus* utilizing conventional techniques. Similarly, treatment of a 6β-azido-7α-acyloxy-1,4 - pregnadriene with a tetraalkylammonium halide according to the first process aspect described hereinabove does not yield isolatable quantities of a 6-azido-1,4,6-pregnatriene of Formula I. It is thus unexpected and particularly advantageous that treatment of a 6-azido-4,6-pregnadiene of Formula I wih DDQ in the presence of a strong acid will yield a 6-azidio-1,4,6-pregnatriene of our invention.

PREPARATION OF ESTERS OF OUR INVENTION 6-azido-4-pregnenes of Formula I having ester groups such as at C–16 and at C–17, can be converted in known manner into 6-azido-4-pregnenes having free hydroxyl groups as, for example, by the action of acidic or alkaline saponification agents. When the 6-azido-4-pregnene of Formula I contains a chlorohydrin or bromohydrin at C–9 and C–11 (i.e. wherein X is halogeno and Y is (H,βOH), we prefer to hydrolyze in a slightly acid medium, e.g. utilizing 70% perchloric acid in methanol-chloroform to minimize epoxide formation at C–9 and C–11. When hydrolyzing ester groups of compounds of Formula I not containing a 9(11)-chlorohydrin or bromohydrin, we usually prefer to use methanolic sodium hydroxide keeping the reaction medium at about 0° C. and under an inert atmosphere, e.g. Argon. If an ester group is present at C–11, it is convenient to convert the esterified compound to the free hydroxy analog by the action of the microorganism *Flavobacterium dehydrogenans*.

Procedures known in the art are utilized to convert a 17-hydroxy compound of our invention, e.g. of Formula I to the corresponding 17-acyl derivative, e.g. of Formula I. Thus, 17α-esters may be prepared by acylation of the corresponding 17α-hydroxy compounds. This is preferably effected by reaction of the steroid with an appropriate acid anhydride in the presence of a strong acid catalyst such as, e.g. p-toluenesulfonic acid, perchloric acid or strongly acidic cation exchange resins, or by using trifluoroacetic anhydride with an appropriate lower alkanoic acid. The reaction may be carried out in the absence of a solvent or in a non-polar solvent, e.g. carbon tetrachloride, benzene, toluene, methylene chloride and chloroform. Heating may or may not be necessary according to the reactivity of the reaction components.

The novel 20 - keto-16α,17α-dihydroxy compounds of Formula I may be converted to the 16α,17-alkylidenedioxy derivatives utilizing procedures known in the art, e.g. by reacting a 16α,17α-hydroxy steroid of Formula I (e.g. 6-azido-16α-hydroxy-6-dehydroprogesterone) with a ketone or aldehyde (e.g. acetone, acetylaldehyde) in the presence of a mineral acid (e.g. hydrochloric acid) whereby is obtained the corresponding 16α,17α-alkylidenedioxy derivative (e.g. 6-azido-16α,17α-isopropylidenedioxy-4,6-pregnadiene-3,20-dione.

The following examples are illustrative of the procedure employed in preparing the compounds of this invention, but are not to be construed as limiting the scope thereof, the scope of our invention being defined only by the appended claims.

PHARMACEUTICAL FORMULATIONS OF 6-AZIDO-16 - METHYLENE - 17α - ACETOXY-4,6-PREGNADIENE-3,20-DIONE (I) Tablet formulations Formula A (5 mg.): Milligrams per tablet
- 6- azido - 16- methylene-17α-acetoxy-4,6-pregnadiene-3,20-dione _____ 5.0
- Starch, food grade _____ 5.0
- Lactose, USP (spray dried) _____ 89.5
- Magnesium stearate, USP _____ 0.5

100.0

Formula B (25 mg.):
- 6-azido - 16 - methylene-17α-acetoxy-4,6-pregnadiene-3,20-dione _____ 25.0
- Starch, food grade _____ 10.0
- Lactose, USP (spray dried) _____ 164.0
- Magnesium stearate, USP _____ 1.0

200.0

Pass the steroid through a high speed mill equipped with a 100 to 150 mesh screen. Blend the milled steroid with the starch in a suitable mixing vessel. Add an equal weight of the spray dried lactose to the blend and mix until uniform. Combine the resultant blend with the remainder of the spray dried lactose and mix until uniform. Charge the magnesium stearate with a portion of the active tablet mix and blend. Blend the magnesium stearate mix with the remaiinng active tablet base. Continue mixing until uniform. Compress to target weight (100.0 mg. for 5 mg. tablet and 200.0 mg. for 25 mg. tablet).

(II) Capsule formulation

Formula: Milligrams per capsule
- 6-azido - 16 - methylene-17α-acetoxy-4,6-pregnadiene-3,20-dione _____ 5.0
- Lactose, USP (spray dried) _____ 292.0
- Magnesium stearate, USP _____ 3.0

300.0

Blend ingredients until uniformly mixed. Fill into hard gelatin capsule.

(III) Parenteral suspension

Formula A (5 mg.): Milligrams per milliliter
- 6-azido - 16 - methylene-17α-acetoxy-4,6-pregnadiene-3,20-dione _____ 5.00
- Methyl cellulose 15 cps., USP _____ 0.05
- Sodium citrate, dihydrate _____ 6.00
- Benzyl alcohol, NF _____ 9.00
- Methylparaben, USP _____ 1.80
- Propylparaben, USP _____ 0.20
- Water for injection (USP), q.s. ad. _____ 1.00

Formula B (25 mg.):
- 6-azido - 16 - methylene-17α-acetoxy-4,6-pregnadiene-3,20-dione _____ 25.00
- Methyl cellulose, 15 cps., USP _____ 0.25
- Sodium citrate, dihydrate _____ 30.00
- Benzyl alcohol, NF _____ 9.00
- Methylparaben, USP _____ 1.80
- Propylparaben, USP _____ 0.20
- Water for injection (USP), q.s. ad. _____ 1.00

Charge 45 l. of water for injection into a suitable stainless steel vessel and heat to 85–90° C. With vigorous agitation, slowly sprinkle the methyl cellulose into the hot water (5 gm. for Formula A or 25 gm. for Formula B). Agitate until the methyl cellulose is thoroughly dispersed and wetted. Add approximately 30 l. of cold (0.5° C.)

water for injection. Cool the entire mixture to 8° C. Dissolve the sodium citrate (600 gm. for Formula A or 3000 gm. for Formula B) in enough water for injection to make 5 l. of solution. Slowly and with agitation add this solution to the cooled methyl cellulose solution. Dissolve the parabens (180 gm. of methyl and 20 gm. of propyl) in 900 gm. of benzyl alcohol which has been heated to 30° C. Charge this solution to the chilled methyl cellulose solution. Bring the resulting solution to 90 l. with water for injection and agitate until uniform. In a sterile area, pass the batch through a sterile filter. Aseptically transfer about 3.5 l. of the sterile methyl cellulose solution to a separate container reserving the remainder of the batch in a sterile stainless steel mixing tank. Slurry the steroid in a sterile colloid mill with about 2 l. of the separated methyl cellulose solution and add the slurry to the solution in the mixing tank. Rinse the slurry container and the mill with the remaining 1.5 l. of reserved methyl cellulose solution and add the rinse to the mixing tank. Adjust the volume in the mixing tank to 100 l. with water for injection and agitate until uniform. The batch affords 100 l. of sterile suspension having the proportions of Formula A or Formula B.

Although the invention has been described above in terms of 6-azido-16-methylene-17α-acetoxy-4,6-pregnadiene-3,20-dione as the essential active ingredient, other 6-azido-6-dehydroprogesterones of our invention as defined by Formula I hereinabove may be used in the above formulations and may be used for the treatment of benign prostatic hypertrophy in a manner similar to that described for 6-azido-16-methylene-17α-acetoxy-6-dehydroprogesterone, the daily dosage of compound to be administered being dependent upon the severity of the patient's condition.

EXAMPLE 1

6-azido - 16 - methylene - 17α - acetoxy-4,6-pregnadiene-3,20 - dione(6-azido-16-methylene-17α-acetoxy-6-dehydroprogesterone)

(A) 6β-azido-7α-hydroxy-16-methylene-17α-acetoxy-4-pregnene-3,20-dione (1) Dissolve 4 g. of 6α,7α-oxido-16-methylene-17α-acetoxy-4-pregnene-3,20-dione in 700 ml. of methanol and add a solution of 8 g. of sodium azide in 240 ml. of water and 4 ml. of acetic acid. Allow the reaction mixture to stand at room temperature overnight then pour into 2 liters of water and extract with chloroform. Dry the combined chloroform extracts over magnesium sulfate, evaporate the solvent to a residue and triturate the residue with ether and filter the resultant solid comprising 6β-azido-7α-hydroxy - 16 - methylene - 17α - acetoxy-4-pregnene-3,20-dione. Purify by crystallization from ethyl acetate-ether to obtain 6β-azido-7α-hydroxy-16-methylene-17α-acetoxy-4-pregnene-3,20-dione. $[\alpha]_D^{26}$ —92.2° (dioxane);

$\lambda_{max.}^{methanol}$ 238 mμ (ε=13,155).

In a similar manner treat each of

6α,7α-oxido-16-methylene-17α-propionoxy-4-pregnene-3,20-dione,
6α,7α-oxido-16-methylene-17α-n-butyroxy-4-pregnene-3,20-dione, and
6α,7α-oxido-16-methylene-17α-valeroxy-4-pregnene-3,20-dione with sodium azide in dilute acetic acid. Isolate and purify the resultant products in a manner similar to that described to obtain, respectively, 6β-azido-7α-hydroxy-16-methylene-17α-propionoxy-4-pregnene-3,20-dione,
6β-azido-7α-hydroxy-16-methylene-17α-n-butyroxy-4-pregnene-3,20-dione, and
6β-azido-7α-hydroxy-16-methylene-17α-valeroxy-4-pregnene-3,20-dione.

(2) Alternatively the compound of this example is prepared as follows. To a solution of 200 mg. of 6α,7α-oxido-16-methylene-17α-acetoxy-4-pregnene-3,20-dione in 40 ml. of methanol add 400 mg. of sodium azide and a solution of 40 mg. boric acid in 5 ml. of water. Stir the mixture of 50° C. for 35 minutes, add 100 ml. of water then extract with chloroform. Wash the combined chloroform extracts with water, dry over magnesium sulfate, then concentrate in vacuo to a residue comprising 6β-azido - 7α - hydroxy - 16 - methylene-17α-acetoxy-4-pregnene-3,20-dione which can be used without further purification in the esterification procedures 1B immediate following.

(B) 6β-azido-7α-methanesulfonyloxy-16-methylene-17α-acetoxy-4-pregnene-3,20-dione (1) Add 1.5 ml. of methanesulfonyl chloride to a solution of 3 g. of 6β-azido-7α-hydroxy-16-methylene-17α-acetoxy-4-pregnene-3,20-dione in 30 ml. of pyridine. Allow the reaction mixture to stand at room temperature for 17 hours then pour into water. Collect the resultant precipitate by filtration and dry in vacuo to obtain 6β-azido - 7α - methanesulfonyloxy - 16 - methylene-17α-acetoxy-4-pregnene-3,20-dione. Purify by crystallization from ether; $[\alpha]_D^{26}$=—110.6° (dioxane).

In the above procedure, by utilizing p-toluenesulfonyl chloride in place of methanesulfonyl chloride, there is obtained the corresponding 7-p-tolenesulfonate ester, i.e. 6β - azido - 7α,17α - dihydroxy-4-pregnene-3,20-dione 7-p-toluenesulfonate 17-acetate.

(2) Similarly, by carrying out the procedure described in paragraph 1 hereinabove, on each of the following:

6β-azido-7α-hydroxy-16-methylene-17α-propionoxy-4-pregnene-3,20-dione,
6β-azido-7α-hydroxy-16-methylene-17α-n-butyroxy-4-pregnene-3,20-dione, and
6β-azido-7α-hydroxy-16-methylene-17α-valeroxy-4-pregnene-3,20-dione, there is obtained respectively,
6β-azido-7α-methanesulfonyloxy-16-methylene-17α-propionoxy-4-pregnene-3,20-dione,
6β-azido-7α-methanesulfonyloxy-16-methylene-17α-n-butyroxy-4-pregnene-3,20-dione, and
6β-azido-7α-methanesulfonyloxy-16-methylene-17α-valeroxy-4-pregnene-3,20-dione.

(C) 6-azido-16-methylene-17α-acetoxy-4,6-pregnadiene-3,20-dione (1) Add 1.5 g. of 6β-azido-7α-methanesulfonyloxy-16-methylene-17α-acetoxy-4-pregnene-3,20-dione to a suspension of 0.750 g. of tetramethylammonium fluoride in 150 ml. of acetonitrile. Allow the reaction mixture to stand at 60° C. for 35 minutes then remove the solvent in vacuo. Dissolve the resultant residue in chloroform and pour into water. Separate the solvent layers and wash the organic solvent layer with aqueous sodium bicarbonate, dry over magnesium sulfate, and evaporate the solvent to a residue comprising 6-azido-16-methylene-17α-acetoxy-4,6-pregnadiene-3,20-dione. Purify by separation on preparative silica gel plates. Further purify by recrystallization from methanol to obtain 6-azido-16-methylene-17α-acetoxy-4,6-pregnadiene-3,20-dione; $[\alpha]_D^{26}$ —63° (dioxane);

$\lambda_{max.}^{methanol}$ 252 mμ (ε=14,616);

$\lambda_{max.}^{methanol}$ 298 mμ (ε=14,616).

(2) Similarly, in the above procedure, by utilizing as starting compounds any one of the following:

6β-azido-7α-p-toluenesulfonyloxy-16-methylene-17α-acetoxy-4-pregnene-3,20-dione,
6β-azido-7α-methanesulfonyloxy-16-methylene-17α-propionoxy-4-pregnene-3,20-dione, 6β-azido-7α-methanesulfonyloxy-16-methylene-17α-n-butyroxy-4-pregnene-3,20-dione, and
6β-azido-7α-methanesulfonyloxy-16-methylene-17α-valeroxy-4-pregnene-3,20-dione, there is obtained, respectively, 6-azido-16-methylene-17α-acetoxy-4,6-pregnadiene-3,20-dione,
6-azido-16-methylene-17α-propionoxy-4,6-pregnadiene-3,20-dione,
6-azido-16-methylene-17α-n-butyroxy-4,6-pregnadiene-3,20-dione, and
6-azido-16-methylene-17α-valeroxy-4,6-pregnadiene-3,20-dione.

(3) Alternatively, the compound of this example is prepared utilizing tetramethylammonium fluoride in dimethylformamide as follows. To a suspension of 100 mg. of tetramethylammonium fluoride in 10 ml. dimethylformamide add 100 mg. 6β-azido-7α-methanesulfonyloxy-16-methylene-17α-acetoxy-4-pregnene-3,20-dione. Allow the reaction mixture to stand at room temperature for 19 hours. Pour the reaction mixture into 175 ml. of water, add 5 g. sodium chloride, collect by filtration the resultant precipitate comprising 6-azido-16-methylene-17α-acetoxy-4,6-pregnadiene-3,20-dione and dry said precipitate at 45° C. in vacuo. Extract the filtrate with methylene chloride and combine with 6-azido-16-methylene-17α-acetoxy-4,6-pregnadiene-3,20-dione. Purify by preparative silica gel plate chromatography.

(4) Alternatively the compound of this example is prepared utilizing tetramethylammonium chloride as reagent as follows. To a suspension of 160 mg. of tetramethylammonium chloride in 15 ml. of acetonitrile add 130 mg. 6β-azido-7α-methanesulfonyloxy-16-methylene-17α-acetoxy-4-pregnene-3,20-dione. Allow the reaction mixture to stand at 60° C. for 26 hours then pour into 100 ml. of water and collect by filtration the resultant precipitate comprising 6-azido-16-methylene-17α-acetoxy-4,6-pregnadiene-3,20-dione. Purify by drying the precipitate at 45° C. in vacuo and separating via preparative thick layer chromatography; yield=60 mg. (58% theoretical yield).

Alternatively, the compound of this example is prepared according to the following procedures D. and E.

(D) 6β-azido-7α,17α-diacetoxy-16-methylene-4-pregnene-3,20-dione

Add 14 ml. of acetic anhydride to a solution of 300 mg. of 6β-azido-7α-hydroxy-16-methylene-17α-acetyl-4-pregnene-3,20-dione in 30 ml. of pyridine and allow the reaction mixture to stand at room temperature for 18 hours. Pour the reaction mixture into 400 ml. of water and stir for 20 minutes. Collect the insoluble fraction by filtration and dry in vacuo to yield a product comprising 6β-azido-7α,17α-diacetoxy - 16 - methylene-4-pregnene-3,20-dione. Purify by crystallization from ethyl acetate: [α]D —119.3° (methanol).

In similar manner, by utilizing as starting compound in the above procedure any one of the following, i.e.

6β-azido-7α-hydroxy-16-methylene-17α-propionoxy-4-pregnene-3,20-dione,
6β-azido-7α-hydroxy-16-methylene-17α-n-butyroxy-4-pregnene-3,20-dione, and
6β-azido-7α-hydroxy-16-methylene-17α-valeroxy-4-pregnene-3,20-dione, respectively, the corresponding 7α-acetate ester:

respectively, the corresponding 7α-acetate ester:

6β-azido-7α-acetoxy-16-methylene-17α-propionoxy-4-pregnene-3,20-dione,
6β-azido-7α-acetoxy-16-methylene-17α-n-butyroxy-4-pregnene-3,20-dione, and
6β-azido-7α-acetoxy-16-methylene-17α-valeroxy-4-pregnene-3,20-dione.

(E) 6-azido-16-methylene-17α-acetoxy-4,6-pregnadiene-3,20-dione (1) In a manner similar to that described in Example 1C treat 6β-azido-7α,17α-diacetoxy - 16 - methylene-4-pregnene-3,20-dione with tetramethylammonium fluoride in acetonitrile at 60° C. for 35 minutes. Isolate and purify the resultant product in a manner similar to that described to obtain 6-azido-16-methylene-17-acetoxy-4,6-pregnadiene-3,20-dione.

In similar manner treat with tetramethylammonium fluoride in acetonitrile each of the following:

6β-azido-7α-acetoxy-16-methylene-17α-propionoxy-4-pregnene-3,20-dione,
6β-azido-7α-acetoxy-16-methylene-17α-n-butyroxy-4-pregnene-3,20-dione, and
6β-azido-7α-acetoxy-16-methylene-17α-valeroxy-4-pregnene-3,20-dione to obtain, respectively,
6-azido-16-methylene-17α-propionoxy-4,6-pregnadiene-3,20-dione,
6-azido-16-methylene-16α-n-butyroxy-4,6-pregnadiene-3,20-dione, and
6-azido-16-methylene-17α-valeroxy-4,6-pregnadiene-3,20-dione.

(2) Alternatively, the above procedure 1E1 may be carried out at room temperature for 18 hours (rather than 60° C. for 35 minutes) and there is formed 6-azido-16-methylene-17α-acetoxy-4,6-pregnadiene-3,20-dione.

(3) Alternatively the compound of this example is prepared as follows. Dissolve 4 g. of tetramethylammonium fluoride pentahydrate in 200 ml. acetonitrile and evaporate in vacuo to a residue. Repeat this procedure once again. To the resultant dry residue comprising tetramethylammonium fluoride add 2.3 g. of 6β-azido-7α,17α-diacetoxy-4-pregnene-3,20-dione in 100 ml. of acetonitrile. Stir the reaction mixture under an atmosphere of argon at 25° C. for two hours. Distill the solvent in vacuo to a residue comprising 6-azido-16-methylene-17α-acetoxy-4,6-pregnadiene-3,20-dione. Purify by chromatographing on Florisil (prewashed with hexane), eluting the product with acetone. Evaporate the combined eluants then crystallize the resultant residue with methanol to obtain 6-azido-16-methylene-17α-acetoxy-4,6 - pregnadiene - 3,20-dione.

(4) Alternatively, the compound of this example is prepared utilizing tetramethylammonium fluoride pentahydrate rather than the anhydrous reagent in the following manner. Add 2 g. of tetramethylammonium fluoride pentahydrate to 200 ml. of acetonitrile and heat the mixture with stirring until the tetramethylammonium fluoride pentahydrate liquifies. Cool to 25° C. under an atmosphere of nitrogen then add 2.2 g. of 6β-azido-7α,17α- diacetoxy-16-methylene-4-pregnene-3,20-dione and stir the reaction mixture under an atmosphere of nitrogen at 25° C. for 3 hours. Concentrate the reaction mixture to about 100 ml. in vacuo at 25° C. then pour into 1 liter of water and extract with ten 100 ml. portions of dichloromethane. Wash the combined extract with two 50 ml. portions of water, dry the dichloromethane over magnesium sulfate, then evaporate in vacuo to a residue. Triturate the residue with about 25 ml. of boiling ether, cool to —20° C. and filter the solid fraction comprising 6-azido-16-methylene-17α-acetoxy-4,6-pregnadiene-3,20-dione. Purify by crystallization from methanol.

EXAMPLE 2

Substituted 6-azido-16-lower alkylidene-17α-lower alkanoyloxy-4,6-pregnadiene-3,20-diones (A) 16-lower alkylidene-17α-lower alkanoyloxy-4,6-pregnadiene-3,20-diones (1) To 4 g. of 16-ethylidene-17α-acetoxy-4-pregnene-3,20-dione add 5 g. of chloranil in 100 ml. of tertiary butanol-dioxane (4:1). Heat the reaction mixture at reflux temperature for 13 hours under an atmosphere of nitrogen. Evaporate the reaction mixture to a residue and extract the residue with ethyl acetate. Wash the combined organic extract with cold 7% aqueous sodium hydroxide, then with water, dry over magnesium sulfate, filter and evaporate to a residue comprising 16 - ethylidene - 17α-acetoxy-4,6-pregnadiene-3,20-dione. Purify by crystallization from acetone/hexane.

(2) Alternatively, the compound of this example is prepared as follows. Add 10.2 g. of dichlorodicyanobenzoquinone to 10.0 g. of 16-ethylidene-17α-acetoxy-4-pregnene-3,20-dione in 600 ml. of dioxane, then bubble in anhydrous hydrogen chloride for 5 minutes with stirring. Continue stirring at ambient temperature for 2.5 hours. Filter the reaction mixture and evaporate the filtrate in vacuo to a residue comprising 16-ethylidene-17α-acetoxy-4,6-pregnadiene-3,20-dione. Purify by dissolving in ethyl acetate, washing the ethyl acetate solution with dilute sodium hydroxide then with water. Dry the organic solution over magnesium sulfate and evaporate in vacuo to a residue. Crystallize the residue in acetone hexane, to give 16-ethylidene-17α-acetoxy-4,6-pregnadiene-3,20-dione.

(3) In a manner similar to that described in Example 2A2 hereinabove, treat each of the following 4-pregnenes with dichlorodicyanobenzoquinone in dioxane:

16-n-butylidene-17α-acetoxy-4-pregnene-3,20-dione,
9α,11β-dichloro-16-methylene-17α-acetoxy-4-pregnene-3,20-dione,
9α,11β-dichloro-16-ethylidene-17α-acetoxy-4-pregnene-3,20-dione,
9α-bromo-11β-fluoro-16-methylene-17α-acetoxy-4-pregnene-3,20-dione,
9α-fluoro-11β-hydroxy-16-methylene-17α-acetoxy-4-pregnene-3,20-dione,
9α-fluoro-16-methylene-17α-acetoxy-4-pregnene-3,11,20-trione,
11β-hydroxy-16-methylene-17α-acetoxy-4-pregnene-3,20-dione,
16-methylene-17α-acetoxy-4-pregnene-3,11,20-trione,
16-methylene-17α-acetoxy-21-fluoro-4-pregnene-3,20-dione,
9α,11β-dichloro-21-fluoro-16-methylene-17α-acetoxy-4-pregnene-3,20-dione,
16-chloromethylene-17α-acetoxy-4-pregnene-3,20-dione,
9α-fluoro-11β-hydroxy-16-chloromethylene-17α-acetoxy-4-pregnene-3,20-dione,
9α-fluoro-11β-hydroxy-16-fluoromethylene-17α-acetoxy-4-pregnene-3,20-dione,
16-fluoromethylene-17α-acetoxy-4-pregnene-3,20-dione, and
11β-hydroxy-16-chloromethylene-17α-acetoxy-4-pregnene-3,20-dione.

Isolate and purify the resultant respective products in a manner similar to that described in Example 2A2 hereinabove to obtain, respectively, 16-n-butylidene-17α-acetoxy-4,6-pregnadiene-3,20-dione,
9α,11β-dichloro-16-methylene-17α-acetoxy-4,6-pregnadiene-3,20-dione,
9α,11β-dichloro-16-ethylidene-17α-acetoxy-4,6-pregnadiene-3,20-dione,
9α-bromo-11β-fluoro-16-methylene-17α-acetoxy-4,6-pregnadiene-3,20-dione,
9α-fluoro-11β-hydroxy-16-methylene-17α-acetoxy-4,6-pregnadiene-3,20-dione,
9α-fluoro-16-methylene-17α-acetoxy-4,6-pregnadiene-3,11,20-trione,
11β-hydroxy-16-methylene-17α-acetoxy-4,6-pregnadiene-3,20-dione,
16-methylene-17α-acetoxy-4,6-pregnadiene-3,11,20-trione,
16-methylene-17α-acetoxy-21-fluoro-4,6-pregnadiene-3,20-dione,
9α,11β-dichloro-21-fluoro-16-methylene-17α-acetoxy-4,6-pregnadiene-3,20-dione,
16-chloromethylene-17α-acetoxy-4,6-pregnadiene-3,20-dione,
9α-fluoro-11β-hydroxy-16-chloromethylene-17α-acetoxy-4,6-pregnadiene-3,20-dione,
9α-fluoro-11β-hydroxy-16-fluoromethylene-17α-acetoxy-4,6-pregnadiene-3,20-dione,
16-fluoromethylene-17α-acetoxy-4,6-pregnadiene-3,20-dione, and
11β-hydroxy-16-chloromethylene-17α-acetoxy-4,6-pregnadiene-3,20-dione.

(B) 6α,7α-oxido-16-lower alkylidene-17α-lower alkanoyloxy-4-pregnene-3,20-diones (1) To a solution of 210 g. of 16-ethylidene-17α-acetoxy-4,6-pregnadiene-3,20-dione in 75 ml. of acetone add 2 g. of m-chloroperbenzoic acid over a period of 2.5 hours. Heat the reaction mixture at reflux temperature for 5 hours, distill the solvent, dissolve the resultant residue in methylene chloride and pour the methylene chloride solution into water. Separate the aqueous layer from the organic solution, wash the organic solution with 200 ml. of 0.2 N sodium hydroxide, dry the organic solution over magnesium sulfate and remove the solvent in vacuo leaving a residue comprising 6α,7α-oxido-16-ethylidene-17α-acetoxy-4-pregnene-3,20-dione. Purify by dissolving in methylene chloride and separating via preparative thick layer chromatography to obtain 6α,7α-oxido-16-ethylidene-17α-acetoxy-4-pregnene-3,20-dione which can be used without further purification in the following Example 2C.

(2) Alternatively, the compound of this example is prepared as follows. To 3.0 g. of 16-ethylidene-17α-acetoxy-4,6-pregnadiene-3,20-dione in 700 ml. of chloroform add 2.7 g. monoperphthalic acid and allow the reaction mixture to stand at room temperature for 60 hours. Isolate the resultant product by washing the chloroform reaction solution successively with aqueous sodium bicarbonate, water, ferrous sulfate solution and again with water. Dry the chloroform solution over magnesium sulfate and distill the solvent to a residue comprising 6α,7α-oxido-16-ethylidene-17α-acetoxy-4-pregnene-3,20-dione. Purify by crystallization from ethyl ether.

(3) Alternatively the compound of this example is prepared in a manner similar to that described in procedure 2B1 by treating 16-ethylidene-17α-acetoxy-4,6-pregnadiene-3,20-dione with m-chloroperbenzoic acid by using as solvent 80 ml. of methylene chloride-tertiary butanol (1:1) (rather than acetone) and carrying out the reaction mixture at reflux temperature for 6 hours to obtain 6α,7α - oxido-16-ethylidene-17α-acetoxy-4-pregnene-3,20-dione.

(4) In a manner similar to that described in Example 2B2 treat each of the 4,6-pregnadienes prepared as described in Example 1A3 with monoperphthalic acid in chloroform. Isolate and purify the resultant respective products in a manner similar to that described to obtain, respectively, 6α,7α-oxido-16-n-butylidene-17α-acetoxy-4-pregnene-3,20-dione,
6α,7α-oxido-9α,11β-dichloro-16-methylene-17α-acetoxy-4-pregnene-3,20-dione,
6α,7α-oxido-9α,11β-dichloro-16-ethylidene-17α-acetoxy-4-pregnene-3,20-dione,
6α,7α-oxido-9α-bromo-11β-fluoro-16-methylene-17α-acetoxy-4-pregnene-3,20-dione,
6α,7α-oxido-9α-fluoro-11β-hydroxy-16-methylene-17α-acetoxy-4-pregnene-3,20-dione,
6α,7α-oxido-9α-fluoro-16-methylene-17α-acetoxy-4-pregnene-3,11,20-trione,
6α,7α-oxido-11β-hydroxy-16-methylene-17α-acetoxy-4-pregnene-3,20-dione,
6α,7α-oxido-16-methylene-17α-acetoxy-4-pregnene-3,11,20-trione,
6α,7α-oxido-16-methylene-17α-acetoxy-21-fluoro-4-pregnene-3,20-dione, 6α,7α-oxido-9α,11β-dichloro-21-fluoro-16-methylene-17α-acetoxy-4-pregnene-3,20-dione,
6α-7α-oxido-16-chloromethylene-17α-acetoxy-4-pregnene-3,20-dione,
6α,7α-oxido-9α-fluoro-11β-hydroxy-16-chloromethylene-17α-acetoxy-4-pregnene-3,20-dione,
6α,7α-oxido-9α-fluoro-11β-hydroxy-16-fluoromethylene-17α-acetoxy-4-pregnene-3,20-dione,
6α,7α-oxido-16-fluoromethylene-17α-acetoxy-4-pregnene-3,20-dione, and
6α,7α-oxido-11β-hydroxy-16-chloromethylene-17α-acetoxy-4-pregnene-3,20-dione.

(C) 6β-azido-7α-hydroxy-16-lower alkylidene-17α-lower alkanoyloxy-4-pregnene-3,20-diones In a manner similar to that described in Example 1A, treat each of the 6α,7α-oxido-16-lower alkylidene-17α-lower alkanoyloxy-4-pregnene-3,20-diones prepared as described in Example 2B with sodium azide in dilute aqueous acetic acid and methanol. Isolate and purify the resultant respective products in a manner similar to that described in Example 1A to obtain, respectively, 6β-azido-7α-hydroxy-16-ethylidene-17α-acetoxy-4-pregnene-3,20-dione,
6β-azido-7α-hydroxy-16-n-butylidene-17α-acetoxy-4-pregnene 3,20-dione,
6β-azido-7α-hydroxy-9α,11β-dichloro-16-methylene-17α-acetoxy-4-pregnene-3,20-dione,
6β-azido-7α-hydroxy-9β,11β-dichloro-16-ethylidene-17α-acetoxy-4-pregnene-3,20-dione,
6β-azido-7α-hydroxy-9α-bromo-11β-fluoro-16-methylene-17α-acetoxy-4-pregnene-3,20-dione,
6β-azido-7α,11β-dihydroxy-9α-fluoro-16-methylene-17α-acetoxy-4-pregnene-3,20-dione,
6β-azido-7α-hydroxy-9α-fluoro-16-methylene-17α-acetoxy-4-pregnene-3,11,20-trione,
6β-azido-7α,11β-dihydroxy-16-methylene-17α-acetoxy-4-pregnene-3,20-dione,
6β-azido-7α-hydroxy-16-methylene-17α-acetoxy-4-pregnene-3,11,20-trione,
6β-azido-7α-hydroxy-16-methylene-17α-acetoxy-21-fluoro-4-pregnene-3,20-dione,
6β-azido-7α-hydroxy-9α,11β-dichloro-21-fluoro-16-methylene-17α-acetoxy-4-pregnene-3,20-dione,
6β-azido-7α-hydroxy-16-chloromethylene-17α-acetoxy-4-pregnene-3,20-dione,
6β-azido-7α,11β-dihydroxy-9α-fluoro-16-chloromethylene-17α-acetoxy-4-pregnene-3,20-dione,
6β-azido-7α,11β-dihydroxy-9α-fluoro-16-fluoromethylene-17α-acetoxy-4-pregnene-3,20-dione,
6β-azido-7α-hydroxy-16-fluoromethylene-17α-acetoxy-4-pregnene-3,20-dione,
6β-azido-7α,11β-dihydroxy-16-chloromethylene-17α-acetoxy-4-pregnene-3,20-dione.

(D) 6β-azido-7α-acetoxy-17α-lower alkanoyloxy-16-lower alkylidene-4-pregnene-3,20-dione In a manner similar to that described in Example 1D treat each of the 6β-azido-7α-hydroxy-16-lower alkylidene-17α- lower alkanoyloxy-4-pregnene-3,20-diones prepared in Example 2C with acetic anhydride in pyridine. Isolate and purify the resultant products in a manner similar to that described in Example 1D to obtain, respectively, 6β-azido-7α,17α-diacetoxy-16-ethylidene-4-pregnene-3,20-dione,
6β-azido-7α,17α-diacetoxy-16-n-butylidene-4-pregnene-3,20-dione,
6β-azido-7α,17α-diacetoxy-9α,11β-dichloro-16-methylene-4-pregnene-3,20-dione,
6β-azido-7α,17α-diacetoxy-9α,11β-dichloro-16-ethylidene-4-pregnene-3,20-dione,
6β-azido-7α,17α-diacetoxy-9α-bromo-11β-fluoro-16-methylene-4-pregnene-3,20-dione,
6β-azido-7α,17α-diacetoxy-9α-fluoro-11β-hydroxy-16-methylene-4-pregnene-3,20-dione,
6β-azido-7α,17α-diacetoxy-9α-fluoro-16-methylene-4-pregnene-3,11,20-trione,
6β-azido-7α,17α-diacetoxy-11β-hydroxy-16-methylene-4-pregnene-3,20-dione,
6β-azido-7α,17α-diacetoxy-16-methylene-4-pregnene-3,11,20-trione,
6β-azido-7α,17α-diacetoxy-16-methylene-21-fluoro-4-pregnene-3,20-dione,
6β-azido-7α,17α-diacetoxy-9α,11β-dichloro-21-fluoro-16-methylene-4-pregnene-3,20-dione,
6β-azido-7α,17α-diacetoxy-16-chloromethylene-4-pregnene-3,20-dione,
6β-azido-7α,17α-diacetoxy-9α-fluoro-11β-hydroxy-16-chloromethylene-4-pregnene-3,20-dione,
6β-azido-7α,17α-diacetoxy-9α-fluoro-11β-hydroxy-16-fluoromethylene-4-pregnene-3,20-dione,
6β-azido-7α,17α-diacetoxy-16-fluoromethylene-4-pregnene-3,20-dione,
6β-azido-17α,17α-diacetoxy-11β-hydroxy-16-chloromethylene-4-pregnene-3,20-dione.

(E) 6-azido-16-lower alkylidene-17α-lower alkanoyloxy-4,6-pregnadiene-3,20-diones In a manner similar to that described in Example 1C treat each of the 6β-azido-7α,17α-diacetoxy-16-lower alkylidene - 4 - pregnene - 3,20 - diones prepared as described in Example 2D with tetramethylammonium fluoride in acetonitrile at 60° C. for 35 minutes. Isolate and purify the resultant respective products in a manner similar to that described in Example 10 to obtain, respectively, 6-azido-16-ethylidene-17α-acetoxy-4,6-pregnadiene-5,20-dione,
6-azido-16-n-butylidene-17α-acetoxy-4,6-pregnadiene-3,20-dione,
6-azido-9α,11β-dichloro-16-methylene-17α-acetoxy-4,6-pregnadiene-3,20-dione,
6-azido-9α,11β-dichloro-16-ethylidene-17α-acetoxy-4,6-pregnadiene-3,20-dione,
6-azido-9α-bromo-11β-fluoro-16-methylene-17α-acetoxy-4,6-pregnadiene-3,20-dione,
6-azido-9α-fluoro-11β-hydroxy-16-methylene-17α-acetoxy-4,6-pregnadiene-3,20-dione,
6-azido-9α-fluoro-16-methylene-17α-acetoxy-4,6-pregnadiene-3,11,20-trione,
6-azido-11β-hydroxy-16-methylene-17α-acetoxy-4,6-pregnadiene-3,20-dione
6-azido-16-methylene-17α-acetoxy-4,6-pregnadiene-3,11,20-trione,
6-azido-16-methylene-17α-acetoxy-21-fluoro-4,6-pregnadiene-3,20-dione,
6-azido-9α,11β-dichloro-21-fluoro-16-methylene-17α-acetoxy-4,6-pregnadiene-3,20-dione,
6-azido-16-chloromethylene-17α-acetoxy-4,6-pregnadiene-3,20-dione,
6-azido-9α-fluoro-11β-hydroxy-16-chloromethylene-17α-acetoxy-4,6-pregnadiene-3,20-dione,
6-azido-9α-fluoro-11β-hydroxy-16-fluoromethylene-17α-acetoxy-4,6-pregnadiene-3,20-dione,
6-azido-16-fluoromethylene-17α-acetoxy-4,6-pregnadiene-3,20-dione,
6-azido-11β-hydroxy-16-chloromethylene-17α-acetoxy-4,6-pregnadiene-3,20-dione

EXAMPLE 3

6-azido-4,6-pregnadiene-3,20-diones (A) 6β-azido-7α-hydroxy-4-pregnene-3,20-diones
(1) The requisite 6α,7α-oxido-4-pregnene-3,20-dione intermediates listed hereinbelow are prepared from the corresponding 6,7-unsubstituted-4-pregnene-3,20-dione in a manner similar to that described in Examples 2A and 2B, i.e. by introduction of a 6,7-dehydro bond by treatment with chloranil in tert.-butanol/dioxane or by treatment with dichlorodicyanobenzoquinone in dioxane followed by treatment of the 4,6-pregnadiene-3,20-dione thereby formed with a peracid as described in Example 2B whereby is obtained the requisite 6α,7α-oxido-4-pregnene-3,20-dione intermediate.

(2) In a manner similar to that described in Example 1A1 treat each of the following 6α,7α-oxido-4-pregnene-3,20-diones with sodium azide in dilute aqueous acetic acid:

6α,7α-oxido-16α,17α-isopropylidenedioxy-4-pregnene-3,20-dione,
6α,7α-oxido-16α,17α-diacetoxy-4-pregnene-3,20-dione,
6α,7α-oxido-9α,11β-dichloro-16α,17α-isopropylidenedioxy-4-pregnene-3,20-dione,
6α,7α-oxido-9α,11β-dichloro-16α,17α-diacetoxy-4-pregnene-3,20-dione,
6α,7α-oxido-9α-fluoro-16α,17α-isopropylidenedioxy-4-pregnene-11β-ol-3,20-dione,
6α,7α-oxido-9α-fluoro-16α,17α-diacetoxy-4-pregnene-11β-ol-3,20-dione,
6α,7α-oxido-16α-methyl-17α-acetoxy-4-pregnene-3,20-dione,
6α,7α-oxido-16β-methyl-17α-acetoxy-4-pregnene-3,20-dione,
6α,7α-oxido-16α-methyl-4-pregnene-17α-ol-3,20-dione,
6α,7α-oxido-16β-methyl-4-pregnene-17α-ol-3,20-dione,
6α,7α-oxido-9α,11β-dichloro-16α-methyl-17α-acetoxy-4-pregnene-3,20-dione,
6α,7α-oxido-9α,11β-dichloro-16β-methyl-17α-acetoxy-4-pregnene-3,20-dione,
6α,7α-oxido-9α,11β-dichloro-16α-methyl-4-pregnene-17α-ol-3,20-dione,
6α,7α-oxido-9α,11β-dichloro-16β-methyl-4-pregnene-17α-ol-3,20-dione,
6α,7α-oxido-16α-methyl-17α-acetoxy-4-pregnene-3,11,20-trione,
6α,7α-oxido-16β-methyl-17α-acetoxy-4-pregnene-3,11,20-trione,
6α,7α-oxido-16α-methyl-4-pregnene-17α-ol-3,11,20-trione,
6α,7α-oxido-16β-methyl-4-pregnene-17α-ol-3,11,20-trione,
6α,7α-oxido-16α-methyl-17α-acetoxy-4-pregnene-11β-ol-3,20-dione,
6α,7α-oxido-16β-methyl-17α-4-pregnene-11β-ol-3,20-dione,
6α-7α-oxido-16α-methyl-4-pregnene-11β,17α-diol-3,20-dione,
6α,7α-oxido-16β-methyl-4-pregnene-11β,17α-diol-3,20-dione,
6α,7α-oxido-9α-fluoro-16α-methyl-17α-acetoxy-4-pregnene-11β-ol-3,20-dione,
6α,7α-oxido-9α-fluoro-16β-methyl-17α-acetoxy-4-pregnene-11β-ol-3,20-dione,
6α,7α-oxido-9α-fluoro-16α-methyl-4-pregnene-11β,17α-diol-3,20-dione,
6α,7α-oxido-9α-fluoro-16β-methyl-4-pregnene-11β,17α-diol-3,20-dione,
6α,7α-oxido-9α-fluoro-16α-methyl-17α-acetoxy-4-pregnene-3,11,20-trione,
6α,7α-oxido-9α-fluoro-16β-methyl-17α-acetoxy-4-pregnene-3,11,20-trione,
6α,7α-oxido-9α-fluoro-16α-methyl-4-pregnene-17α-ol-3,11,20-trione,
6α,7α-oxido-9α-fluoro-16β-methyl-4-pregnene-17α-ol-3,11,20-trione,
6α,7α-oxido-16α-methyl-17α-acetoxy-21-fluoro-4-pregnene-3,20-dione,
6α,7α-oxido-16β-methyl-17α-acetoxy-21-fluoro-4-pregnene-3,20-dione,
6α,7α-oxido-16α-methyl-21-fluoro-4-pregnene-17α-ol-3,20-dione,
6α,7α-oxido-16β-methyl-21-fluoro-4-pregnene-17α-ol-3,20-dione,
6α,7α-oxido-9α,21-difluoro-4-pregnene-17α-ol-3,11,20-trione,
6α,7α-oxido-9α,21-difluoro-16α-methyl-4-pregnene-17α-ol-3,11,20-trione,
6α,7α-oxido-9α,21-difluoro-16β-methyl-4-pregnene-17α-ol-3,11,20-trione,
6α,7α-oxido-9α,21-difluoro-4-pregnene-11β,17α-diol-3,20-dione,
6α-7α-oxido-9α,21-difluoro-16α-methyl-4-pregnene-11β,17α-diol-3,20-dione,
6α,7α-oxido-9α,21-difluoro-16β-methyl-4-pregnene-11β,17α-diol-3,20-dione,
6α,7α-oxido-21-fluoro-4-pregnene-17α-ol-3,11,20-trione,
6α,7α-oxido-16α-methyl-21-fluoro-4-pregnene-17α-ol-3,11,20-trione,
6α,7α-oxido-16β-methyl-21-fluoro-4-pregnene-17α-ol-3,11,20-trione,
6α,7α-oxido-21-fluoro-4-pregnene-17α-ol-3,20-dione,
6α,7α-oxido-16α-methyl-21-fluoro-4-pregnene-17α-ol-3,20-dione,
6α,7α-oxido-16β-methyl-21-fluoro-4-pregnene-17α-ol-3,20-dione,
6α,7α-oxido-4-pregnene-3,20-dione,
6α,7α-oxido-16α-methyl-4-pregnene-3,20-dione,
6α,7α-oxido-16β-methyl-4-pregnene-3,20-dione,
6α,7α-oxido-21-fluoro-4-pregnene-3,20-dione,
6α,7α-oxido-16α-methyl-21-fluoro-4-pregnene-3,20-dione,
6α,7α-oxido-16β-methyl-21-fluoro-4-pregnene3,20-dione,
6α,7α-oxido-4-pregnene-3,11,20-trione,
6α,7α-oxido-16α-methyl-4-pregnene-3,11,20-trione,
6α,7α-oxido-16β-methyl-4-pregnene-3,11,20-trione,
6α,7α-oxido-4-pregnene-11β-ol-3,20-dione,
6α,7α-oxido-16α-methyl-4-pregnene-11β-ol-3,20-dione,
6α,7α-oxido-16β-methyl-4-pregnene-11β-ol-3,20-dione,
6α,7α-oxido-9α,11β-dichloro-4-pregnene-3,20-dione,
6α,7α-oxido-9α,11β-dichloro-16α-methyl-4-pregnene-3,20-dione,
6α,7α-oxido-9α,11β-dichloro-16β-methyl-4-pregnene-3,20-dione,
6α,7α-oxido-9α-bromo-11β-chloro-4-pregnene-3,20-dione,
6α,7α-oxido-9α-bromo-11β-chloro-16α-methyl-4-pregnene-3,20-dione,
6α,7α-oxido-9α-bromo-11β-chloro-16β-methyl-4-pregnene-3,20-dione,
6α,7α-oxido-9α,11β-dichloro-21-fluoro-4-pregnene-3,20-dione,
6α,7α-oxido-9α,11β-dichloro-21-fluoro-16α-methyl-4-pregnene-3,20-dione,
6α,7α-oxido-9α,11β-dichloro-21-fluoro-16β-methyl-4-pregnene-3,20-dione.

Isolate and purify the resultant respective products in a manner similar to that described in Example 1A1 to obtain respectively:

6β-azido-7α-hydroxy-16α,17α-isopropylidenedioxy-4-pregnene-3,20-dione,
6β-azido-7α-hydroxy-16α,17α-diacetoxy-4-pregnene-3,20-dione,
6β-azido-7α-hydroxy-9α,11β-dichloro-16α,17α-isopropylidenedioxy-4-pregnene-3,20-dione,
6β-azido-7α-hydroxy-9α,11β-dichloro-16α,17α-diacetoxy-4-pregnene-3,20-dione,
6β-azido-7α-hydroxy-9α-fluoro-16α,17α-isopropylidenedioxy-4-pregnene-11β-ol-3,20-dione,
6β-azido-7α-hydroxy-9α-fluoro-16α,17α-diacetoxy-4-pregnene-11β-ol-3,20-dione,
6β-azido-7α-hydroxy-16α-methyl-17α-acetoxy-4-pregnene-3,20-dione,
6β-azido-7α-hydroxy-16β-methyl-17α-acetoxy-4-pregnene-3,20-dione,
6β-azido-7α-hydroxy16α-methyl-4-pregnene-17α-ol-3,20-dione,
6β-azido-7α-hydroxy-16β-methyl-4-pregnene-17α-ol-3,20-dione, 6β-azido-7α-hydroxy-9α,11β-dichloro-16α-methyl-17α-
acetoxy-4-pregnene-3,20-dione,
6β-azido-7α-hydroxy-9α,11β-dichloro-16β-methyl-17α-
acetoxy-4-pregnene-3,20-dione,
6β-azido-7α-hydroxy-9α,11β-dichloro-16α-methyl-4-
pregnene-17α-ol-3,20-dione,
6β-azido-7α-hydroxy-9α,11β-dichloro-16β-methyl-4-
pregnene-17α-ol-3,20-dione,
6β-azido-7α-hydroxy-16α-methyl-17α-acetoxy-4-
pregnene-3,11,20-trione,
6β-azido-7α-hydroxy-16β-methyl-17α-acetoxy-4-
pregnene-3,11,20-trione,
6β-azido-7α-hydroxy-16α-methyl-4-pregnene-17α-ol-
3,11,20-trione,
6β-azido-7α-hydroxy-16β-methyl-4-pregnene-17α-ol-
3,11,20-trione,
6β-azido-7α-hydroxy-16α-methyl-17α-acetoxy-4-
pregnene-11β-ol-3,20-dione,
6β-azido-7α-hydroxy-16β-methyl-17α-acetoxy-4-
pregnene-11β-ol-3,20-dione,
6β-azido-17α-hydroxy-16α-methyl-4-pregnene-11β,17α-
diol-3,20-dione,
6β-azido-7α-hydroxy-16β-methyl-4-pregnene-11β,17α-
diol-3,20-dione,
6β-azido-7α-hydroxy-9α-fluoro-16α-methyl-17α-acetoxy-4-
pregnene-11β-ol-3,20-dione,
6β-azido-7α-hydroxy-9α-fluoro-16β-methyl-17α-acetoxy-
4-pregnene-11β-ol-3,20-dione,
6β-azido-7α-hydroxy-9α-fluoro-16α-methyl-4-pregnene-
11β,17α-diol-3,20-dione,
6β-azido-7α-hydroxy-9α-fluoro-16β-methyl-4-
pregnene-11β,17α-diol-3,20-dione,
6β-azido-7α-hydroxy-9α-fluoro-16α-methyl-17α-acetoxy-
4-pregnene-3,11,20-trione,
6β-azido-7α-hydroxy-9α-fluoro-16β-methyl-17α-acetoxy-
4-pregnene-3,11,20-trione,
6β-azido-7α-hydroxy-9α-fluoro-16α-methyl-4-pregnene-
17α-ol-3,11,20-trione,
6β-azido-7α-hydroxy-9α-fluoro-16β-methyl-4-pregnene-
17α-ol-3,11,20-trione,
6β-azido-7α-hydroxy-16α-methyl-17α-acetoxy-21-fluoro-
4-pregnene-3,20-dione,
6β-azido-7α-hydroxy-16β-methyl-17α-acetoxy-21-fluoro-
4-pregnene-3,20-dione,
6β-azido-7α-hydroxy-16α-methyl-21-fluoro-4-pregnene-
17α-ol-3,20-dione,
6β-azido-7α-hydroxy-16β-methyl-21-fluoro-4-pregnene-
17α-ol-3,20-dione,
6β-azido-7α-hydroxy-9α,21-difluoro-4-pregnene-17α-
ol-3,11,20-trione,
6β-azido-7α-hydroxy-9α,21-difluoro-16α-methyl-4-
pregnene-17α-ol-3,11,20-trione,
6β-azido-7α-hydroxy-9α,21-difluoro-16β-methyl-4-
pregnene-17α-ol-3,11,20-trione,
6β-azido-7α-hydroxy-9α,21-difluoro-4-pregnene-11β,17α-
diol-3,20-dione,
6β-azido-7α-hydroxy-9α,21-difluoro-16α-methyl-4-
pregnene-11β,17α-diol-3,20-dione,
6β-azido-7α-hydroxy-9α,21-difluoro-16β-methyl-4-
pregnene-11β,17α-diol-3,20-dione,
6β-azido-7α-hydroxy-21-fluoro-4-pregnene-17α-ol-
3,11,20-trione,
6β-azido-7α-hydroxy-16α-methyl-21-fluoro-4-pregnene-
17α-ol-3,11,20-trione,
6β-azido-7α-hydroxy-16β-methyl-21-fluoro-4-pregnene-
17α-ol-3,11,20-trione,
6β-azido-7α-hydroxy-21-fluoro-4-pregnene-17α-ol-
3,20-dione,
6β-azido-7α-hydroxy-16α-methyl-21-fluoro-4-pregnene-
17α-ol-3,20-dione,
6β-azido-7α-hydroxy-16β-methyl-21-fluoro-4-pregnene-
17α-ol-3,20-dione,
6β-azido-7α-hydroxy-4-pregnene-3,20-dione,
6β-azido-7α-hydroxy-16α-methyl-4-pregnene-3,20-dione,
6β-azido-7α-hydroxy-16β-methyl-4-pregnene-3,20-dione,
6β-azido-7α-hydroxy-21-fluoro-4-pregnene-3,20-dione,
6β-azido-7α-hydroxy-16α-methyl-21-fluoro-4-pregnene-
3,20-dione,
6β-azido-7α-hydroxy-16β-methyl-21-fluoro-4-pregnene-
3,20-dione,
6β-azido-7α-hydroxy-4-pregnene-3,11,20-trione,
6β-azido-7α-hydroxy-16α-methyl-4-pregnene-3,11,20-
trione,
6β-azido-7α-hydroxy-16β-methyl-4-pregnene-3,11,20-
trione,
6β-azido-7α-hydroxy-4-pregnene-11β-ol-3,20-dione,
6β-azido-7α-hydroxy-16α-methyl-4-pregnene-11β-ol-
3,20-dione,
6β-azido-7α-hydroxy-16β-methyl-4-pregnene-11β-ol-
3,20-dione,
6β-azido-7α-hydroxy-9α,11β-dichloro-4-pregnene-3,20-
dione,
6β-azido-7α-hydroxy-9α,11β-dichloro-16α-methyl-4-
pregnene-3,20-dione,
6β-azido-7α-hydroxy-9α,11β-dichloro-16β-methyl-4-
pregnene-3,20-dione,
6β-azido-7α-hydroxy-9α-bromo-11β-chloro-4-pregnene-
3,20-dione,
6β-azido-7α-hydroxy-9α-bromo-11β-chloro-16α-methyl-4-
pregnene-3,20-dione,
6β-azido-7α-hydroxy-9α-bromo-11β-chloro-16β-methyl-
4-pregnene-3,20-dione,
6β-azido-7α-hydroxy-9α,11β-dichloro-21-fluoro-
4-pregnene-3,20-dione,
6β-azido-7α-hydroxy-9α,11β-dichloro-21-fluoro-16α-
methyl4-pregnene-3,20-dione,
6β-azido-7α-hydroxy-9α,11β-dichloro-21-fluoro-16β-
methyl-4-pregnene-3,20-dione, (B) 6β-azido-7α-acetoxy-4-pregnene-3,20-diones In a manner similar to that described in Example 1D, treat each of the 6β-azido-7α-hydroxy-4-pregnene-3,20-diones prepared in Example 3A with acetic anhydride in pyridine. Isolate and purify the resultant respective products in a manner similar to that described in Example 1D to obtain, respectively:

β6-azido-7α-acetoxy-16α,-17α-isopropylidenedioxy-
4-pregnene-3,20-dione,
6β-azido-7α,16α,17α-triacetoxy-4-pregnene-3,20-dione,
6β-azido-7α-acetoxy-9α,11β-dichloro-16α,17α-iso-
propylidenedioxy-4-pregnene-3,20-dione,
6β-azido-7α,16α,17α-triacetoxy-9α,11β-dichloro-4-
pregnene-3,20-dione,
6β-azido-7α-acetoxy-9α-fluoro-16α,17α-isopropylidene-
dioxy-4-pregnene-11β-ol-3,20-dione,
6β-azido-7α,16α,17α-triacetoxy-9α-fluoro-4-pregnene-
11β-ol-3,20-dione,
6β-azido-7α,17α-diacetoxy-16α-methyl-4-pregnene-
3,20-dione,
6β-azido-7α,17α-diacetoxy-16β-methyl-4-pregnene-
3,20-dione,
6β-azido-7α-acetoxy-16α-methyl-4-pregnene-17α-ol-
3,20-dione,
6β-azido-7α-acetoxy-16β-methyl-4-pregnene-17α-ol-
3,20-dione,
6β-azido-7α,17α-diacetoxy-9α,11β-dichloro-16α-methyl-
4-pregnene-3,20-dione,
6β-azido-7α,17α-diacetoxy-9α,11β-dichloro-16β-methyl-4-
pregnene-3,20-dione,
6β-azido-7α-acetoxy-9α,11β-dichloro-16α-methyl-4-
pregnene-17α-ol-3,20-dione,
6β-azido-7α-acetoxy-9α,11β-dichloro-16β-methyl-4-
pregnene-17α-ol-3,20-dione,
6β-azido-7α,17α-diacetoxy-16α-methyl-4-pregnene-
3,11,20-trione,
6β-azido-7α,17α-diacetoxy-16β-methyl-4-pregnene-
3,11,20-trione, 6β-azido-7α-acetoxy-16α-methyl-4-pregnene-17α-ol-3,11,20-trione,
6β-azido-7α-acetoxy-16β-methyl-4-pregnene-17α-ol-3,11,20-trione,
6β-azido-7α,17α-diacetoxy-16α-methyl-4-pregnene-11β-ol-3,20-dione,
6β-azido-7α,17α-diacetoxy-16β-methyl-4-pregnene-11β-ol-3,20-dione,
6β-azido-7α-acetoxy-16α-methyl-4-pregnene-11β,17α-diol-3,20-dione,
6β-azido-7α-acetoxy-16β-methyl-4-pregnene-11β,17α-diol-3,20-dione,
6β-azido-7α,17α-diacetoxy-9α-fluoro-16α-methyl-4-pregnene-11β-ol-3,20-dione,
6β-azido-7α,17α-diacetoxy-9α-fluoro-16β-methyl-4-pregnene-11β-ol-3,20-dione,
6β-azido-7α-acetoxy-9α-fluoro-16α-methyl-4-pregnene-11β,17α-diol-3,20-dione,
6β-azido-7α-acetoxy-9α-fluoro-16β-methyl-4-pregnene-11β,17α-diol-3,20-dione,
6β-azido-7α,17α-diacetoxy-9α-fluoro-16α-methyl-4-pregnene-3,11,20-trione,
6β-azido 7α,17α-diacetoxy-9α-fluoro-16β-methyl-4-pregnene-3,11,20-trione,
6β-azido-7α-acetoxy-9α-fluoro-16α-methyl-4-pregnene-17α-ol-3,11,20-trione,
6β-azido-7α-acetoxy-9α-fluoro-16β-methyl-4-pregnene-17α-ol-3,11,20-trione,
6β-azido-7α,17α-diacetoxy-16α-methyl-21-fluoro-4-pregnene-3,20-dione,
6β-azido-7α,17α-diacetoxy-16β-methyl-21-fluoro-4-pregnene-3,20-dione,
6β-azido-7α-acetoxy-16α-methyl-21-fluoro-4-pregnene-17α-ol-3,20-dione,
6β-azido-7α-acetoxy-16β-methyl-21-fluoro-4-pregnene-17α-ol-3,20-dione,
6β-azido-7α-acetoxy-9α,21-difluoro-4-pregnene-17α-ol-3,11,20-trione,
6β-azido-7α-acetoxy-9α,21-difluoro-16α-methyl-4-pregnene-17α-ol-3,11,20-trione,
6β-azido-7α-acetoxy-9α,21-difluoro-16β-methyl-4-pregnene-17α-ol-3,11,20-trione,
6β-azido-7α-acetoxy-9α,21-difluoro-4-pregnene-11β,17α-diol-3,20-dione,
6β-azido-7α-acetoxy-9α,21-difluoro-16α-methyl-4-pregnene-11β,17α-diol-3,20-dione,
6β-azido-7α-acetoxy-9α,21-difluoro-16β-methyl-4-pregnene-11β,17α-diol-3,20-dione,
6β-azido-7α-acetoxy-21-fluoro-4-pregnene-17α-ol-3,11,20-trione,
6β-azido-7α-acetoxy-16α-methyl-21-fluoro-4-pregnene-17α-ol-3,11,20-trione,
6β-azido-7α-acetoxy-16β-methyl-21-fluoro-4-pregnene-17α-ol-3,11,20-trione,
6β-azido-7α-acetoxy-21-fluoro-4-pregnene-17α-ol-3,20-dione,
6β-azido-7α-acetoxy-16α-methyl-21-fluoro-4-pregnene-17α-ol-3,20-dione,
6β-azido-7α-acetoxy-16β-methyl-21-fluoro-4-pregnene-17α-ol-3,20-dione,
6β-azido-7α-acetoxy-4-pregnene-3,20-dione,
6β-azido-7α-acetoxy-16α-methyl-4-pregnene-3,20-dione,
6β-azido-7α-acetoxy-16β-methyl-4-pregnene-3,20-dione,
6β-azido-7α-acetoxy-21-fluoro-4-pregnene-3,20-dione,
6β-azido-7α-acetoxy-16α-methyl-21-fluoro-4-pregnene-3,20-dione,
6β-azido-7α-acetoxy-16β-methyl-21-fluoro-4-pregnene-3,20-dione,
6β-azido-7α-acetoxy-4-pregnene-3,11,20-trione,
6β-azido-7α-acetoxy-16α-methyl-4-pregnene-3,11,20-trione,
6β-azido-7α-acetoxy-16β-methyl-4-pregnene-3,11,20-trione,
6β-azido-7α-acetoxy-4-pregnene-11β-ol-3,20-dione,
6β-azido-7α-acetoxy-16α-methyl-4-pregnene-11β-ol-3,20-dione,
6β-azido-7α-acetoxy-16β-methyl-4-pregnene-11β-ol-3,20-dione,
6β-azido-7α-acetoxy-9α,11β-dichloro-4-pregnene-3,20-dione,
6β-azido-7α-acetoxy-9α,11β-dichloro-16α-methyl-4-pregnene-3,20-dione,
6β-azido-7α-acetoxy-9α,11β-dichloro-16β-methyl-4-pregnene-3,20-dione,
6β-azido-7α-acetoxy-9α-bromo-11β-chloro-4-pregnene-3,20-dione,
6β-azido-7α-acetoxy-9α-bromo-11β-chloro-16α-methyl-4-pregnene-3,20-dione,
6β-azido-7α-acetoxy-9α-bromo-11β-chloro-16β-methyl-4-pregnene-3,20-dione,
6β-azido-7α-acetoxy-9α,11β-dichloro-21-fluoro-4-pregnene-3,20-dione,
6β-azido-7α-acetoxy-9α,11β-dichloro-21-fluoro-16α-methyl-4-pregnene-3,20-dione.
6β-azido-7α-acetoxy-9α,11β-dichloro-21-fluoro-16β-methyl-4-pregnadiene-11β-ol-3,20-dione, (C) 6-azido-4,6-pregnadiene-3,20-diones In a manner similar to that described in Example 10 treat each of the 6β-azido-7α-acetoxy-4-pregnene-3,20-diones prepared as described in Example 3B with tetramethylammonium fluoride in acetonitrile at 60° C. Isolate and purify the resultant respective products in a manner similar to that described in Example 10 to obtain, respectively:

6-azido-16α,17α-isopropylidenedioxy-4,6-pregnadiene-3,20-dione,
6-azido-16α,17α-diacetoxy-4,6-pregnadiene-3,20-dione,
6-azido-9α,11β-dichloro-16α,17α-isopropylidenedioxy-4,6-pregnadiene-3,20-dione,
6-azido-9α,11β-dichloro-16α,17α-diacetoxy-4,6-pregnadiene-3,20-dione,
6-azido-9α-fluoro-16α,17α-isopropylidenedioxy-4,6-pregnadiene-11β,ol-3,20-dione,
6-azido-9α-fluoro-16α,17α-diacetoxy-4,6-pregnadiene-11β-ol-3,20-dione,
6-azido-16α-methyl-17α-acetoxy-4,6-pregnadiene-3,20-dione,
6-azido-16β-methyl-17α-acetoxy-4,6-pregnadiene-3,20-dione,
6-azido-16α-methyl-4,6-pregnadiene-17α-ol-3,20-dione,
6-azido-16β-methyl-4,6-pregnadiene-17α-ol-3,20-dione,
6-azido-9α,11β-dichloro-16α-methyl-17α-acetoxy-4,6-pregnadiene-3,20-dione,
6-azido-9α,11β-dichloro-16β-methyl-17α-acetoxy-4,6-pregnadiene-3,20-dione,
6-azido-9α,11β-dichloro-16α-methyl-4,6-pregnadiene-17α-ol-3,20-dione,
6-azido-9α,11β-dichloro-16β-methyl-4,6-pregnadiene-17α-ol-3,20-dione,
6-azido-16α-methyl-17α-acetoxy-4,6-pregnadiene-3,11,20-trione,
6-azido-16β-methyl-17α-acetoxy-4,6-pregnadiene-3,11-20-trione,
6-azido-16α-methyl-4,6-pregnadiene-17α-ol-3,11,20-trione,
6-azido-16β-methyl-4,6-pregnadiene-17α-ol-3,11,20-trione,
6-azido-16α-methyl-17α-acetoxy-4,6-pregnadiene-11β-ol-3,20-dione,
6-azido-16β-methyl-17α-acetoxy-4,6-pregnadiene-11β-ol-3,20-dione,
6-azido-16α-methyl-4,6-pregnadiene-11β,17α-diol-3,20-dione,
6-azido-16β-methyl-4,6-pregnadiene-11β,17α-diol-3,20-dione,
6-azido-9α-fluoro-16α-methyl-17α-acetoxy-4,6-pregnadiene-11β-ol-3,20-dione, 6-azido-9α-fluoro-16β-methyl-17α-acetoxy-4,6-pregnadiene-11β-ol-3,20-dione,
6-azido-9α-fluoro-16α-methyl-4,6-pregnadiene-11β,17α-diol-3,20-dione,
6-azido-9α-fluoro-16β-methyl-4,6-pregnadiene-11β,17α-diol-3,20-dione,
6-azido-9α-fluoro-16α-methyl-17α-acetoxy-4,6-pregnadiene-3,11,20-trione,
6-azido-9α-fluoro-16β-methyl-17α-acetoxy-4,6-pregnadiene-3,11,20-trione,
6-azido-9α-fluoro-16α-methyl-4,6-pregnadiene-17α-ol-3,11,20-trione,
6-azido-9α-fluoro-16β-methyl-4,6-pregnadiene-17α-ol-3,11,20-trione,
6-azido-16α-methyl-17α-acetoxy-21-fluoro-4,6-pregnadiene-3,20-dione,
6-azido-16β-methyl-17α-acetoxy-21-fluoro-4,6-pregnadiene-3,20-dione,
6-azido-16α-methyl-21-fluoro-4,6-pregnadiene-17α-ol-3,20-dione,
6-azido-16β-methyl-21-fluoro-4,6-pregnadiene-17α-ol-3,20-dione,
6-azido-9α,21-difluoro-4,6-pregnadiene-17α-ol-3,11,20-trione,
6-azido-9α,21-difluoro-16α-methyl-4,6-pregnadiene-17α-ol-3,11,20-trione,
6-azido-9α,21-difluoro-16β-methyl-4,6-pregnadiene-17α-ol-3,11,20-trione,
6-azido-9α,21-difluoro-4,6-pregnadiene-11β,17α-diol-3,20-dione,
6-azido-9α,21-difluoro-16α-methyl-4,6-pregnadiene-11β,17α-diol-3,20-dione,
6-azido-9α,21-difluoro-16β-methyl-4,6-pregnadiene-11β-17α-diol-3,20-dione,
6-azido-21-fluoro-4,6-pregnadiene-17α-ol-3,11,20-trione,
6-azido-16α-methyl-21-fluoro-4,6-pregnadiene-17α-ol-3,11,20-trione,
6-azido-16β-methyl-21-fluoro-4,6-pregnadiene-17α-ol-3,11,20-trione,
6-azido-21-fluoro-4,6-pregnadiene-17α-ol-3,20-dione,
6-azido-16α-methyl-21-fluoro-4,6-pregnadiene-17α-ol-3,20-dione,
6-azido-16β-methyl-21-fluoro-4,6-pregnadiene-17α-ol-3,20-dione,
6-azido-4,6-pregnadiene-3,20-dione,
6-azido-16α-methyl-4,6-pregnadiene-3,20-dione,
6-azido-16β-methyl-4,6-pregnadiene-3,20-dione,
6-azido-21-fluoro-4,6-pregnadiene-3,20-dione,
6-azido-16α-methyl-21-fluoro-4,6-pregnadiene-3,20-dione,
6-azido-16β-methyl-21-fluoro-4,6-pregnadiene-3,20-dione,
6-azido-4,6-pregnadiene-3,11,20-trione,
6-azido-16α-methyl-4,6-pregnadiene-3,11,20-trione,
6-azido-16β-methyl-4,6-pregnadiene-3,11,20-trione,
6-azido-4,6-pregnadiene-11β-ol-3,20-dione,
6-azido-16α-methyl-4,6-pregnadiene-11β-ol-3,20-dione,
6-azido-16β-methyl-4,6-pregnadiene-11β-ol-3,20-dione,
6-azido-9α,11β-dichloro-4,6-pregnadiene-3,20-dione,
6-azido-9α,11β-dichloro-16α-methyl-4,6-pregnadiene-3,20-dione,
6-azido-9α,11β-dichloro-16β-methyl-4,6-pregnadiene-3,20-dione,
6-azido-9α-bromo-11β-chloro-4,6-pregnadiene-3,20-dione,
6-azido-9α-bromo-11β-chloro-16α-methyl-4,6-pregnadiene-3,20-dione,
6-azido-9α-bromo-11β-chloro-16β-methyl-4,6-pregnadiene-3,20-dione,
6-azido-9α,11β-dichloro-21-fluoro-4,6-pregnadiene-3,20-dione,
6-azido-9α,11β-dichloro-21-fluoro-16α-methyl-4,6-pregnadiene-3,20-dione,
6-azido-9α,11β-dichloro-21-fluoro-16β-methyl-4,6-pregnadiene-3,20-dione.

EXAMPLE 4

Alternate procedure for preparation of 6-azido - 16-methylene - 17α - hydroxy - 4,6 - pregnadiene-3,20-dione and the 17α-acetate thereof (A) 6β-azido-7α-hydroxy-16β-methyl-16α,17α-oxido-4-pregnene-3,20-dione To a solution of 8 g. of 6α,7α;16α,17α-bis-oxido-16β-methyl - 4 - pregnene - 3,20 - dione in 1500 ml. of methanol add a solution of 20 g. sodium azide in 100 ml. of water. Allow the reaction mixture to stand at room temperature overnight then pour into water, extract with chloroform and dry the combined extracts over magnesium sulfate. Filter the chloroform solution and evaporate to a residue comprising 6β-azido - 7α - hydroxy -16β - methyl-16α,17α - oxido - 4 - pregnene - 3,20 - dione. Purify by crystallization from ethyl acetate, M.P. 217° C. (dec.) $[\alpha]_D^{26}$ +53.5 (dioxane).

(B) 6β-azido-7α,17α-diacetoxy-16-methylene-4-pregnene-3,20-dione

To a solution comprising 520 mg. of 6β-azido-7α-hydroxy-16β-methyl-16α,17α - oxido - 4 - pregnene-3,20-dione in 8 ml. of acetic acid and 80 mg. of p-toluenesulfonic acid cooled to 5° C. add 4 ml. of trifluoroacetic anhydride. Allow the reaction mixture to stand at room temperature for 25 minutes then pour into water and collect by filtration the resultant precipitate comprising 6β-azido - 7α,17α - diacetoxy-16-methylene-4-pregnene-3,20-dione. Purify by drying the precipitate and crystallizing from ethyl acetate-ether to obtain 280 mg. of 6β-azido-7α,17α - diacetoxy - 16 - methylene-4-pregnene-3,20-dione: $[\alpha]_D^{26}$ —119.3 (dioxane).

(C) 6-azido-16-methylene-17α-acetoxy-4,6-pregnadiene-3,20-dione

In a manner similar to that described in Example 1E1 treat 6β-azido - 7α,17α - diacetoxy-16-methylene-4-pregnene-3,20-dione with tetramethylammonium fluoride in acetonitrile at 60° C. for 35 minutes. Isolate and purify the resultant product in the manner described to obtain 6-azido-16-methylene-17α-acetoxy - 4,6-pregnadiene-3,20-dione.

The corresponding 6 - azido-17α-hydroxy-4,6-pregnadiene is obtained via the 16β-methyl-16α,17α-oxido intermediate according to following procedures D, E, and F.

(D) 6β-azido-7α-methanesulfonyloxy-16β-methyl-16α,17α-oxido-4-pregnene-3,20-dione Add 0.75 ml. of methanesulfonyl chloride to a solution of 1.5 g. of 6β - azido-7α-hydroxy-16β-methyl-16α,17α-oxido-4-pregnene-3,20-dione in 15 ml. of pyridine. Allow the reaction mixture to stand at room temperature for 17 hours then pour into water and extract with methylene chloride, wash the combined methylene chloride extracts with dilute aqueous sodium bicarbonate solution then with water and dry over magnesium sulfate. Filter the methylene chloride solution and evaporate to a residue comprising 1.65 g. of 6β-azido-7α-methanesulfonyloxy-16β-methyl-16α,17α-oxido-4-pregnene-3,20-dione.

In the above procedure by utilizing p-toluenesulfonyl chloride instead of methanesulfonyl chloride, there is obtained the corresponding p-toluenesulfonate ester, i.e. 6β-azido - 7α - p - toluenesulfonyloxy-16β-methyl-16α,17α-oxido-4-pregnene-3,20-dione.

(E) 6β-azido-7α-methanesulfonyloxy-16-methylene-17α-hydroxy-4-pregnene-3,20-dione To a solution of 0.8 g. of 6β-azido-7α-methanesulfonyloxy-16β-methyl-16α,17α-oxido - 4 - pregnene-3,20-dione in 17 ml. of acetic acid, at room temperature add 1.7 ml. of a 10% solution of hydrobromic acid in acetic acid.

Allow the reaction mixture to stand at room temperature for 30 minutes then dilute with 2 liters of water. Extract with methylene chloride and wash the methylene chloride extracts with water and evaporate to a residue comprising 6β - azido - 7α - methanesulfonyloxy-16-methylene-17α-hydroxy-4-pregnene-3,20-dione which is used without further purification in following procedure F.

In similar manner, by treating 6β-azido-7α-p-toluenesulfonyloxy-16β-methyl-16α,17α - oxido - 4 - pregnene-3,20-dione with hydrobromic acid in acetic acid there is obtained 6β-azido - 7α - p-toluenesulfonyloxy-16-methylene-17α-hydroxy-4-pregnene-3,20-dione.

(F) 6-azido-16-methylene-17α-hydroxy-4,6-pregnadiene-3,20-dione

In a manner similar to that described in Example 1C1 treat 6β-azido - 7α - methanesulfonyloxy-16-methylene-17α-hydroxy-4-pregnene-3,20-dione prepared as described in preceding Example 4E with tetramethylammonium fluoride in acetonitrile. Isolate and purify the resultant product in a manner similar to that described to obtain 6-azido-16-methylene-17α-hydroxy - 4,6 - pregnadiene-3,20-dione.

In similar manner treat 6β-azido-7α-p-toluenesulfonyloxy - 16 - methylene-17α-hydroxy-4-pregnene-3,20-dione with tetramethyl-ammonium fluoride in acetonitrile to obtain 6-azido - 16 - methylene-17α-hydroxy-4,6-pregnadiene-3,20-dione.

Alternatively, the 6-azido-16-methylene-17α-hydroxy-4,6-pregnadiene of this example is prepared from the compound of Example 4D according to following procedures 4G and 4H.

(G) 6-azido-16β-methyl-16α,17α-oxido-4,6-pregnadiene-3,20-dione

In a manner similar to that described in Example 1E1 except that the reaction mixture is allowed to stand at 60° C. for 16 hours rather than 30 minutes, treat 6β-azido - 7α-methanesulfonyloxy-16β-methyl-16α,17α-oxido-4-pregnene-3,20-dione with tetramethylammonium fluoride in acetonitrile. Isolate the resultant product via preparative thin layer chromatographic techniques to obtain 6-azido-16β-methyl-16α,17α-oxido-4,6-pregnadiene-3,20-dione.

(H) 6-azido-16-methylene-17α-hydroxy-4,6-pregnadiene-3,20-dione

In a manner similar to that described in Example 4E treat 6-azido-16β-methyl-16α,17α-oxido-4,6-pregnadiene-3,20-dione with hydrobromic acid in acetic acid at room temperature for 30 minutes. Isolate and purify the resultant product in a manner similar to that described to obtain 6 - azido - 16 - methylene-17α-hydroxy-4,6-pregnadiene-3,20-dione.

(I)

The 17α-acetoxy compound of this example is also prepared by treating 6-azido-16β-methyl-16α,17α-oxido-4,6-pregnadiene-3,20-dione with acetic acid, p-toluenesulfonic acid and trifluoroacetic anhydride in the manner described in Example 4B to obtain 6-azido-16-methylene-17α-acetoxy-4,6-pregnadiene-3,20-dione.

EXAMPLE 5

Alternate method for preparing 6-azido-16-methylene-17α-acetoxy-4,6-pregnadiene-3,20-dione Stir a mixture of 100 mg. of 6β-azido-7α,17α-dihydroxy-16-methylene-4-pregnene-3,20-dione 17-acetate in 3.15 ml. of dioxane, 3.15 ml. of acetic acid and 0.7 ml. concentrated hydrochloric acid at 25° C. for 24 hours. Then add 60 ml. of methylene chloride and wash the methylene chloride solution with water then dilute aqueous sodium bicarbonate solution and again with water. Dry the methylene chloride solution over magnesium sulfate, filter and evaporate the solution in vacuo to a residue comprising 6-azido-16-methylene-17α-acetoxy-4,6-pregnadiene-3,20-dione. Purify by chromatography on a preparative silica gel plate.

In similar manner, treat 6β-azido-7α,17α-diacetoxy-16-methylene-4-pregnene-3,20-dione with concentrated hydrochloric acid in dioxane and acetic acid to obtain 6-azido - 16 - methylene-17α-acetoxy-4,6-pregnadiene-3,20-dione.

Similarly, by treating the 6β-azido-7α-hydroxy-4-pregnenes and the 7α-lower alkanoates thereof prepared as described in preceding Examples 1–4 with concentrated hydrochloric acid there is obtained the corresponding 6-azido-4,6-pregnadiene.

EXAMPLE 6

6-azido-16-methylene-17α-acetoxy-1,4,6-pregnatriene-3,20-dione

Prepare a hydrochloric acid-dioxane solution by adding 0.5 ml. of concentrated hydrochloric acid and 5 ml. of water to 49.5 ml. of dioxane. To 7.8 ml. of this hydrochloric acid-dioxane solution add 132 mg. of 6-azido-16-methylene - 17α - acetoxy-4,6-pregnadiene-3,20-dione and 146 mg. of 2,3-dichloro-5,6-dicyanobenzoquinone (DDQ). Under an atmosphere of nitrogen warm the solution to 60° C. with stirring for 30 minutes. Pour the reaction mixture into 100 ml. of water and extract with ethyl acetate. Wash the combined ethyl acetate extracts with concentrated aqueous sodium sulfite solution and then with water. Dry the ethyl acetate solution over magnesium sulfate and filter. Pass the solution through a Florisil column and evaporate the eluant in vacuo to a residue comprising 6 - azido - 16 - methylene - 17α - acetoxy-1,4,6-pregnatriene-3,20-dione. Purify by fractional crystallization from di-isopropyl ether-hexane.

In similar manner by treating each of the 6-azido-4,6-pregnadiene-3,20-diones prepared in preceding Examples 1–5 with DDQ there is obtained the corresponding 6-azido-1,4,6-pregnatriene-3,20-dione.

EXAMPLE 7

Preparation of 21-iodo and 21-bromo-6-azido-4,6-pregnadienes and use thereof as intermediates (A) 6-azido-4,6-pregnadiene-17α,21-diol-3,20-dione 21-methanesulfonates (1) The requisite 6-azido-21-hydroxy-4,6-pregnadiene intermediates are prepared by treating the corresponding 6α,7α-oxido-4-pregnene-17α,21-diol-3,20-dione 21-lower alkanoate in dioxane and methanol with sodium azide in aqueous acetic acid followed by treatment of the resultant 6β - azido - 7α-hydroxy-4-pregnene-17α,21-diol-3,20-dione 21-lower alkanoate with acetic anhydride in pyridine to obtain the corresponding 7-acetate ester, i.e., 6β-azido-7α-acetoxy - 4 - pregnene-17α,21-diol-3,20-dione 21-lower -alkanoate. Treatment of the foregoing with tetramethylammonium fluoride in acetonitrile yields 6-azido-4,6-pregnadiene-17α,21-diol-3,20-dione 21-lower alkanoate which upon hydrolysis in aqueous methanol with sodium hydroxide at 0° C. yields the necessary 6-azido-4,6-pregnadiene-17α,21-diol-3,20-dione intermediate.

To a solution of 5 g. of 6-azido-4,6-pregnadiene-17α,21-diol-3,11,20-trione in 50 ml. of pyridine cooled to −20° C., add dropwise 5 ml. of methanesulfonyl chloride. Stir at −20° C. for 30 minutes then pour into water and stir for 2 hours longer at room temperature. Filter and dry the resultant precipitate comprising 6-azido-4,6-pregnadiene - 17α,21 - diol - 3,11,20-trione 21-methanesulfonate. Purify by crystallization from acetone-hexane.

(2) In a similar manner treat each of the following with methanesulfonyl chloride in pyridine at −20° C.:

6-azido-4,6-pregnadiene-11β,17α,21-triol-3,20-dione,
6-azido-9α-fluoro-16α-methyl-4,6-pregnadiene-11β,17α, 21-triol-3,20-dione, 6-azido-9α-fluoro-16β-methyl-4,6-pregnadiene-11β,17α,
  21-triol-3,20-dione,
6-azido-16α-methyl-4,6-pregnadiene-17α,21-diol-3,11,20-
  trione,
6-azido-16β-methyl-4,6-pregnadiene-17α,21-diol-3,11,20-
  trione,
6-azido-9α-fluoro-16α,17α-iso-propylidenedioxy-4,6-
  pregnadiene-11β,21-diol-3,20-dione,
6-azido-9α-fluoro-16-methylene-4,6-pregnadiene-11β,17α,
  21-triol-3,20-dione, and
6-azido-4,6-pregnadiene-21-ol-3,20-dione.

Isolate and purify the resultant respective products in a manner similar to that described in Example 7A1 to obtain, respectively:

6-azido-4,6-pregnadiene-11β,17α,21-triol-3,20-dione
  21-methanesulfonate,
6-azido-9α-fluoro-16α-methyl-4,6-pregnadiene-11β,17α,
  21-triol-3,20-dione 21-methanesulfonate,
6-azido-9α-fluoro-16β-methyl-4,6-pregnadiene-11β,17α,
  21-triol-3,20-dione 21-methanesulfonate,
6-azido-16α-methyl-4,6-pregnadiene-17α,21-diol-3,11,20-
  trione 21-methanesulfonate,
6-azido-16β-methyl-4,6-pregnadiene-17α,21-diol-3,11,20-
  trione 21-methanesulfonate,
6-azido-9α-fluoro-16α,17α-iso-propylidenedioxy-4,6-preg-
  nadiene-11β,21-diol-3,20-dione 21-methanesulfonate,
6-azido-9α-fluoro-16-methylene-4,6-pregnadiene-11β,17α,
  21-triol-3,20-dione 21-methanesulfonate, and
6-azido-4,6-pregnadiene-2-ol-3,20-dione 21-methanesulfonate.

(B) 6-azido-21-iodo-4-pregnene-17α-ol-3,20-diones (1) To 3.5 g. of 6-azido-4,6-pregnadiene-17α,21-diol-3,11,20-trione 21-methanesulfonate in 52.5 ml. of acetone add 3.5 g. of sodium iodide. Heat the reaction mixture at reflux temperature for 20 minutes then pour into 500 ml. of water, filter and air dry the resultant precipitate comprising 6 - azido-21-iodo-4,6-pregnadiene-17α-ol-3,11,20-trione. Purify by crystallization from acetone-hexane.

(2) In a similar manner treat each of the methanesulfonate ester derivatives prepared as described in Example 7A2 with sodium iodide in acetone in the manner described in Example 7B1 to obtain, respectively:

6-azido-21-iodo-4,6-pregnadiene-11β,17α-diol-3,20-dione,
6-azido-9α-fluoro-21-iodo-16α-methyl-4,6-pregnadiene-
  11β,17α-diol-3,20-dione,
6-azido-9α-fluoro-21-iodo-16β-methyl-4,6-pregnadiene-
  11β,17α-diol-3,20-dione,
6-azido-16α-methyl-21-iodo-4,6-pregnadiene-17α-ol-3,
  11,20-trione,
6-azido-16β-methyl-21-iodo-4,6-pregnadiene-17α-ol-3,
  11,20-trione,
6-azido-9α-fluoro-21-iodo-16α,17α-iso-propylidenedioxy-
  4,6-pregnadiene11β-ol-3,20-dione,
6-azido-9α-fluoro-21-iodo-16-methylene-4,6-pregnadiene-
  11β,17α-diol-3,20-dione, and
6-azido-21-iodo-4,6-pregnadiene-3,20-dione.

(3) By following the procedure described in Example 7B1 by utilizing sodium bromide instead of sodium iodide there is obtained the corresponding 21-bromo compound, i.e. 6-azido-21-bromo-4,6-pregnadiene-17α-ol-3,11,20- trione. Similarly, the 21-bromo analogs of the 21-iodo compounds listed in Example 7B2 are prepared by treating the corresponding 21-methanesulfonates in acetone with sodium bromide.

(C) 6-azido-4-pregnene-17α,21-diol-3,20-dione
  21-phosphate esters (1) To 43 ml. of methanol at room temperature add dropwise with stirring 24 ml. of 85% aqueous phosphoric acid. Add cautiously 75.4 ml. of triethylamine followed by 12.7 g. of 6-azido-21-iodo-4,6-pregnadiene-17α-ol-3,11,20-trione. Warm the reaction mixture on a steam bath for 30 minutes then with stirring pour the reaction mixture into water (260 ml.) containing concentrated hydrochloric acid (72.5 ml.). Filter the resultant precipitate comprising 6-azido-4,6-pregnadiene-17α,21-diol-3,11,20-trione 21-phosphate. Purify by crystallization from aqueous acetone.

(2) In a similar manner treat each of the 21-iodo-4-pregnenes as described in Example 7B2 with 85% phosphoric acid in triethylamine and methanol. Isolate and purify the resultant respective products in a manner similar to that described to obtain respectively:

6-azido-4,6-pregnadiene-11β,17α,21-triol-3,20-dione 21-
  phosphate,
6-azido-9α-fluoro-16α-methyl-4,6-pregnadiene-11β,17α,
  21-triol-3,20-dione 21-phosphate,
6-azido-9α-fluoro-16β-methyl-4,6-pregnadiene-11β,17α,
  21-triol-3,20-dione 21-phosphate,
6-azido-16α-methyl-4,6-pregnadiene-17α,21-diol-3,11,
  20-trione 21-phosphate,
6-azido-16β-methyl-4,6-pregnadiene-17α,21-diol-3,11,20-
  trione 21-phosphate,
6-azido-9α-fluoro-16α,17α-iso-propylidenedioxy-4,6-
  pregnadiene-11β,21-diol-3,20-dione 21-phosphate,
6-azido-9α-fluoro-16-methylene-4,6-pregnadiene-11β,17α,
  21-triol-3,20-dione 21-phosphate, and
6-azido-4,6-pregnadiene-21-ol-3,20-dione 21-phosphate.

(D) Preparation of 6-azido-6-dehydroprogesterones from the corresponding 6-azido-21-iodo-6-dehydroprogesterone (1) To 0.9 g. of 6-azido-21-iodo-4,6-pregnadiene-17α-ol-3,11,20-trione in 20 ml. of dimethylformamide add 2.2 g. of sodium iodide followed by 5 ml. acetic acid, and stir at 45° C. for 30 minutes. Pour into dilute aqueous sodium bisulfite and collect the resultant precipitate comprising 6-azido-4,6-pregnadiene-17α-ol-3,11,20-trione.

In similar manner 6-azido-21-bromo-4,6-pregnadiene-17β-ol-3,20-dione upon treatment with sodium iodide in dimethylformamide and acetic acid is reduced to the corresponding progesterone, i.e. 6-azido-4,6-pregnadiene-17α-ol-3,11,20-trione.

(2) In similar manner treat each of the 21-iodo derivatives prepared as described in Example 7B2 with sodium iodide in dimethylformamide and acetic acid to obtain respectively:

6-azido-4,6-pregnadiene-11β,17α-diol-3,20-dione,
6-azido-9α-fluoro-16α-methyl-4,6-pregnadiene-11β,17α-
  diol-3,20-dione,
6-azido-9α-fluoro-16β-methyl-4,6-pregnadiene-11β,17α-
  diol-3,20-dione,
6-azido-16α-methyl-4,6-pregnadiene-17α-ol-3,11,20-trione,
6-azido-16β-methyl-4,6-pregnadiene-17α-ol-3,11,20-trione,
6-azido-9α-fluoro-16α,17α-iso-propylidenedioxy-4,6-
  pregnadiene-11β-ol-3,20-dione,
6-azido-9α-fluoro-16-methylene-4,6-pregnadiene-11β,
  17α-diol-3,20-dione, and
6-azido-4,6-pregnadiene-3,20-dione.

EXAMPLE 8

Hydrolysis of 6-azido-17α-acyloxy-4,6-pregnadiene-3,20-diones to the corresponding 17-hydroxy derivatives To a solution of 2 g. of 6-azido-16-methylene-17α-acetoxy-4,6-pregnadiene-3,20-dione in 15 ml. of tetrahydrofuran, 10 ml. of methanol and 5 ml. of water at 0° C. add 5 ml. of 1 N aqueous sodium hydroxide with stirring while bubbling nitrogen through the solution. Allow the solution temperature to rise to room temperature and continue stirring under a blanket of nitrogen at room temperature for another two hours, then neutralize the reaction mixture with acetic acid, pour into water and filter the resultant precipitate comprising 6-azido-16-methylene-17α-hydroxy-4,6-pregnadiene-3,20-dione. Purify by crystallization from acetone-hexane.

In a similar manner the 17α-acyloxy derivatives of the 6-azido-4,6-pregnadienes and 6-azido-1,4,6-pregnatrienes of preceding Examples 1-7 are converted to the corresponding 17α-hydroxy derivative by hydrolysis with aqueous sodium hydroxide in tetrahydrofuran-methanol.

EXAMPLE 9

Esterification of 6-azido-17α-hydroxy-4,6-pregnadiene-3,20-diones to the corresponding 17-acyloxy derivative (A) 6-azido-16-methylene-17α-lower alkanoyloxy-4,6-pregnadienes To a solution comprising 520 mg. of 6-azido-16-methylene-17α-hydroxy-4,6-pregnadiene-3,20-dione in 8 ml. of acetic acid and 80 mg. of p-toluenesulfonic acid cooled to 5° C. add 4 ml. of trifluoroacetic anhydride. Allow the reaction mixture to stand at room temperature for 25 minutes then pour into water and collect by filtration the resultant precipitate comprising 6-azido-16-methylene-17α-acetoxy-4,6-pregnadiene-3,20-dione. Purify by drying the precipitate and crystallizing from methanol; $[\alpha]_D^{26}$ —63° (dioxane).

In the above procedure, by utilizing other lower alkanoic acids instead of acetic acid such as propionic, butyric and valeric, there is obtained the corresponding ester, i.e. the 17-propionate, 17-butyrate and 17-valerate, respectively of 6-azido-16-methylene-17α-hydroxy-4,6-pregnadiene.

In similar manner the 17α-hydroxy compounds of this invention prepared as described in preceding Examples 1–8 are esterified under conditions known to esterify tertiary alcohols such as described in the above two paragraphs.

EXAMPLE 10

6-azido-16-lower alkylidene-17α-acetoxy-4,6-pregnadiene-3,20-diones (A) Following the procedures described in Examples 4A, 4B, and 4C, treat each of 6α,7α;16α,17α-bis-oxido-16β-ethyl-4-pregnene-3,20-dione,
6α,7α;16α,17α-bis-oxido-16β-n-propyl-4-pregnene-3,20-dione, and
6α,7α;16α,17α-bis-oxido-16β-n-butyl-4-pregnene-3,20-dione with sodium azide to obtain respectively:

6β-azido-7α-hydroxy-16β-ethyl-16α,17α-oxido-4-pregnene-3,20-dione,
6β-azido-7α-hydroxy-16β-n-propyl-16α,17α-oxido-4-pregnene-3,20-dione, and
6β-azido-7α-hydroxy-16β-n-butyl-16α,17α-oxido-4-pregnene-3,20-dione;

followed by esterification of each of the foregoing with acetic acid and p-toluenesulfonic acid together with trifluoroacetic anhydride to obtain, respectively, 6β-azido-7α,17α-diacetoxy-16-ethylidene-4-pregnene-3,20-dione,
6β-azido-7α,17α-diacetoxy-16-n-propylidene-4-pregnene-3,20-dione, and
6β-azido-7α,17α-diacetoxy-16-n-butylidene-4-pregnene-3,20-dione.

Treatment of each of the foregoing with tetramethylammonium fluoride in acetonitrile yields, respectively 6-azido-16-ethylidene-17α-acetoxy-4,6-pregnadiene-3,20-dione,
6-azido-16-n-propylidene-17α-acetoxy-4,6-pregnadiene-3,20-dione, and
6-azido-16-n-butylidene-17α-acetoxy-4,6-pregnadiene-3,20-dione.

(B) Alternatively, the 6-azido-16-lower alkylidene-17α-acetoxy compounds of this example are prepared following procedures set forth in Examples 4D, 4G, and 4I; thus treatment of each of 6β-azido-7α-hydroxy-16β-ethyl-16α,17α-oxido-4-pregnene-3,20-dione,
6β-azido-7α-hydroxy-16β-n-propyl-16α,17α-oxido-4-pregnene-3,20-dione, and
6β-azido-7α-hydroxy-16β-n-butyl-16α,17α-oxido-4-pregnene-3,20-dione with methanesulfonyl chloride in pyridine yields, respectively, 6β-azido-7α-methanesulfonyloxy-16β-ethyl-16α,17α-oxido-4-pregnene-3,20-dione,
6β-azido-7α-methanesulfonyloxy-16β-n-propyl-16α,17α-oxido-4-pregnene-3,20-dione, and
6β-azido-7α-methanesulfonyloxy-16β-n-butyl-16α,17α-oxido-4-pregnene-3,20-dione.

Treatment of each of the foregoing with tetramethylammonium fluoride in acetonitrile yields, respectively 6-azido-16β-ethyl-16α,17α-oxido-4,6-pregnadiene-3,20-dione,
6-azido-16β-n-propyl-16α,17α-oxido-4,6-pregnadiene-3,20-dione, and
6-azido-16β-n-butyl-16α,17α-oxido-4,6-pregnadiene-3,20-dione.

Treatment of each of the foregoing with acetic acid, p-toluenesulfonic acid and trifluoroacetic anhydride yields, respectively 6-azido-16-ethylidene-17α-acetoxy-4,6-pregnadiene-3,20-dione,
6-azido-16-n-propylidene-17α-acetoxy-4,6-pregnadiene-3,20-dione, and
6-azido-16-n-butylidene-17α-acetoxy-4,6-pregnadiene-3,20-dione.

EXAMPLE 11

6-azido-16-lower alkylidene-17α-hydroxyl-4,6-pregnadiene-3,20-diones

By following the procedures similar to those set forth in Examples 4E and 4F, treat each of 6β-azido-7α-methanesulfonyloxy-16β-ethyl-16α,17α-oxido-4-pregnene-3,20-dione,
6β-azido-7α-methanesulfonyloxy-16β-n-propyl-16α,17α-oxido-4-pregnene-3,20-dione, and
6β-azido-7α-methanesulfonyloxy-16β-n-butyl-16α,17α-oxido-4-pregnene-3,20-dione with hydrobromic acid in acetic acid to obtain, respectively, 6β-azido-7α-methanesulfonyloxy-16-ethylidene-17α-hydroxy-4-pregnene-3,20-dione,
6β-azido-7α-methanesulfonyloxy-16-n-propylidene-17α-hydroxy-4,6-pregnadiene-3,20-dione, and
6β-azido-7α-methanesulfonyloxy-16-n-butylidene-17α-hydroxy-4-pregnene-3,20-dione.

Treatment of each of the foregoing with tetramethylammonium fluoride in acetonitrile yields, respectively, 6-azido-16-ethylidene-17α-hydroxy-4,6-pregnadiene-3,20-dione,
6-azido-16-n-propylidene-17α-hydroxy-4,6-pregnadiene-3,20-dione, and
6-azido-16-n-butylidene-17α-hydroxy-4,6-pregnadiene-3,20-dione.

We claim:
1. A compound selected from the group consisting of

6-azido-6-dehydroprogesterones of following Formula I and the 1-dehydro- analogs thereof:

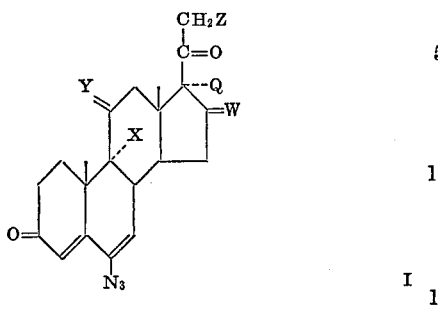

wherein Q is a member selected from the group consisting of hydroxy, OR, wherein R is an acyl radical of a hydrocarbon carboxylic acid having up to 12 carbon atoms, and hydrogen, provided W is hydrogen or (H, lower alkyl);
W is a member selected from the group consisting of hydrogen, (H,α-lower alkyl), (H,β-lower alkyl), (H,α-hydroxy), (H,α-OR') wherein R' is an acyl radical of hydrocarbon carboxylic acid having up to 12 carbon atoms, =CHT wherein T is a member selected from the group consisting of hydrogen, lower alkyl, fluorine and chlorine, and W taken together with Q when Q is hydroxy and W is (H,α-hydroxy), the 16α,17α-lower alkylidene derivatives thereof;
X is a member selected from the group consisting of hydrogen and a halogen having an atomic weight less than 100;
Y is a member selected from the group consisting of hydrogen, oxygen, (H,βOH), and, provided X is halogen (H,β halogen of atomic weight less than 100);
Z is a member selected from the group consisting of hydrogen and halogen.

2. A compound according to claim 1, Formula I.

3. A compound according to claim 1, Formula I, wherein W is =CHT, Q is lower alkanoyloxy, and Z is hydrogen.

4. A compound according to claim 1, Formula I, wherein W is =CH₂, Q is lower alkanoyloxy and Z is hydrogen, said compound being 9αX-11β-Y-6-azido-16-methylene-17α-lower alkanoyloxy-4,6-pregnadiene - 3,20-dione.

5. A compound according to claim 1, Formula I, wherein W is =CH₂, X, Y and Z are hydrogen, and Q is lower alkanoyloxy, said compound being 6-azido-16-methylene-17α-lower alkanoyloxy-4,6-pregnadiene - 3,20-dione.

6. A compound according to claim 1, Formula I, wherein W is =CH₂, X, Y and Z are hydrogen, and Q is acetoxy, said compound being 6-azido-16-methylene-17α-acetoxy-4,6-pregnadiene-3,20-dione.

7. A 1,2-dehydro compound according to claim 1, wherein W is =CH₂, X, Y and Z are hydrogen and Q is acetoxy, said compound being 6-azido-16-methylene-17α-acetoxy-1,4,6-pregnatriene-3,20-dione.

8. A compound selected from the group consisting of 6β-azido-7α-oxygenated - 4 - pregnene-3,20-diones of the following formula and the 1-dehydro analog thereof:

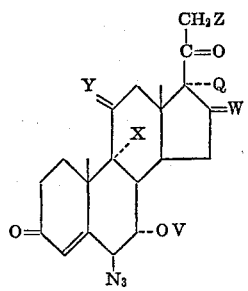

wherein Q is a member selected from the group consisting of hydroxy, OR, wherein R is an acyl radical of a hydrocarbon carboxylic acid having up to 12 carbon atoms, and hydrogen provided W is hydrogen or (H, lower alkyl);
V is a member selected from the group consisting of hydrogen and an acyl radical of an acid selected from the group consisting of a hydrocarbon carboxylic acid having up to 8 carbon atoms and a hydrocarbonsulfonic acid having up to 7 carbon atoms;
W is a member selected from the group consisting of hydrogen, (H,α-lower alkyl), (H,β-lower alkyl), (H,α-hydroxy), (H,α-OR') wherein R' is an acyl radical of a hydrocarbon carboxylic acid having up to 12 carbon atoms, =CHT wherein T is a member selected from the group consisting of hydrogen, lower alkyl, fluorine and chlorine, and, together with Q when Q is hydroxy and W is (H,α-hydroxy), the 16α,17α-lower alkylidene derivatives thereof;
X is a member selected from the group consisting of hydrogen and a halogen having an atomic weight less than 100;
Y is a member selected from the group consisting of hydrogen, oxygen, (H,βOH), and, provided X is halogen, (H,β halogen of atomic weight less than 100) and, provided X is hydrogen, (H,αOV') V' being a member selected from the group consisting of hydrogen and an acyl radical of a hydrocarbon sulfonic acid having up to 7 carbon atoms, and Y and X taken together are members selected from the group consisting of a 9(11)-dehydro bond and a 9β,11β-epoxy group;
Z is a member selected from the group consisting of hydrogen and halogen.

9. A compound according to claim 8 wherein V, X, Y and Z are hydrogen, W is =CH₂, and Q is acetoxy, said compound being 6β-azido - 7α,17α - dihydroxy - 16-methylene-4,6-pregnadiene-3,20-dione 17-acetate.

10. A compound according to claim 8 wherein V is methanesulfonyl, W is =CH₂, X, Y and Z are hydrogen, and Q is acetoxy, said compound being 6β-azido-7α,17α-dihydroxy - 16 - methylene-4,6-pregnadiene-3,20-dione 7-methanesulfonate 17-acetate.

11. A compound according to claim 8 wherein Q is hydroxy, W is =CH₂ and V, X, Y and Z are hydrogen, said compound being 6β-azido-7α,17α-hydroxy-16-methylene-4,6-pregnadiene-3,20-dione.

12. A process for preparing 6-azido-4,6-pregnadiene-3,20-diones of the following Formula I:

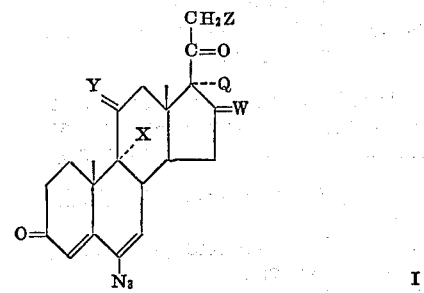

wherein Q is a member selected from the group consisting of hydroxy, OR, wherein R is an acyl radical of a hydrocarbon carboxylic acid having up to 12 carbon atoms, and hydrogen, provided W is hydrogen or (H, lower alkyl);
W is a member selected from the group consisting of hydrogen, (H,α-lower alkyl), (H,β-lower alkyl), (H,α-hydroxy), (H,α-OR') wherein R' is an acyl radical of a hydrocarbon carboxylic acid having up to 12 carbon atoms, =CHT wherein T is a member selected from the group consisting of hydrogen, lower alkyl, fluorine and chlorine, and, together with Q when Q is hydroxy and W is (H,α-hydroxy), the 16α,17α-lower alkylidene deratives thereof;

X is a member selected from the group consisting of hydrogen and a halogen having an atomic weight less than 100;

Y is a member selected from the group consisting of hydrogen, oxygen, (H,βOH), and, provided X is halogen, (H,β halogen of atomic weight less than 100);

Z is a member selected from the group consisting of hydrogen and halogen;

which comprises treating a 6α,7α-oxido-4-pregnene-3,20-dione of the following Formula A:

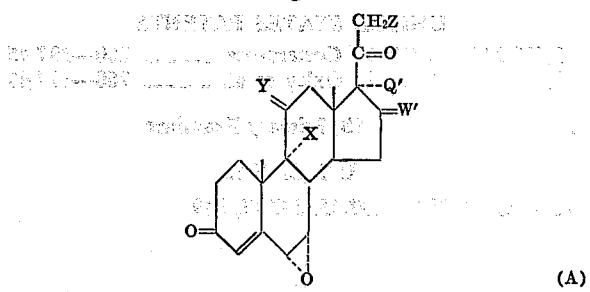

(A)

wherein X, Y and Z are as hereinabove defined for Formula I, W' is as hereinabove defined for W in Formula I, Q' is as hereinabove defined for Q in Formula I, and together W' and Q' form 16β-lower alkyl-16α,17α-oxidowith an alkali metal azide in a non-reactive, organic solvent;

treating the resulting 6β-azido-7α-hydroxy-4-pregnene-3,20-dione of the following Formula B:

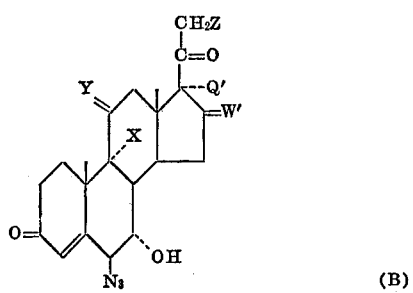

(B)

wherein Q', W', X, Y and Z are as hereinabove defined for Formula A, with an acylating reagent selected from the group consisting of an acid anhydride of a hydrocarbon carboxylic acid having up to 8 carbon atoms and an acyl halide of an acid selected from the group consisting of a hydrocarbon carboxylic acid having up to 8 carbon atoms and a hydrocarbon sulfonic acid having up to seven carbon atoms; and treating the resulting 6β-azido-7α-acyloxy-4-pregnene-3,20-dione of the following Formula C:

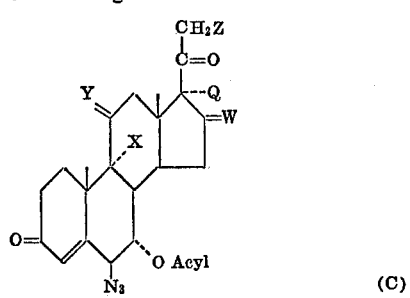

(C)

wherein Q, W, X, Y, and Z are as defined hereinabove for Formula I;

with a tetraalkylammonium halide in an aprotic solvent.

13. The process according to claim 12 including the step of isolating the 6-azido-4,6-pregnadiene of Formula I produced hereby.

14. The process according to claim 12 wherein said alkali metal azide in a non-reactive solvent is sodium azide in aqueous dioxane-methanol;

wherein said acylating reagent is acetic anhydride in pyridine; and wherein said tetraalkylammonium halide in an aprotic solvent is tetramethylammonium fluoride in acetonitrile, said process for preparing a 6-azido-4,6-pregnadiene of Formula I comprising treating a 6α,7α-oxido-4-pregnene of Formula A with sodium azide in aqueous dioxane-methanol;

treating the resulting 6β-azido-7α-hydroxy-4-pregnene of Formula B with acetic anhydride in pyridine, and treating the resulting 6β-azido-7α-acetoxy-4-pregnene of Formula C wherein acyl is acetyl, with tetramethylammonium fluoride in acetonitrile.

15. The process according to claim 12 wherein said 6α,7α - oxido - 4 - pregnene-3,20-dione is a compound of Formula A wherein X, Y and Z are hydrogen, W is =CH$_2$, Q is acetoxy, and wherein said compound of Formula A is treated with an alkali metal azide in a non-reactive solvent in the presence of acetic acid, said alkali metal azide in a non-reactive solvent being sodium azide in aqueous dioxane-methanol;

and wherein said acylating reagent is acetic anhydride in pyridine and said tetraalkyl-ammonium halide is tetramethyl-ammonium fluoride in acetonitrile;

said process comprising treating 6α,7α-oxido-16-methylene - 17α - acetoxy - 4 - pregnene-3,20-dione with sodium azide in aqueous dioxane-methanol in the presence of acetic acid;

treating the resulting 6β-azido-7α-hydroxy-16-methylene-17α - acetoxy - 4 - pregnene-3,20-dione with acetic anhydride in pyridine;

and treating the resulting 6β-azido-7α-17α-diacetoxy-16-methylene - 4 - pregnene-3,20-dione with tetramethyl-ammonium fluoride in acetonitrile, whereby is prepared 6 - azido - 16-methylene-17α-acetoxy-4,6-pregnadiene-3,20-dione.

16. The process according to claim 15 and including the step of isolating the 6-azido-16-methylene-17α-acetoxy-4,6-pregnadiene-3,20-dione thereby formed.

17. The process according to claim 12 wherein said 6α,7α - oxido - 4 - pregnene-3,20-dione is a compound of Formula A wherein X, Y and Z are hydrogen, and W' and Q' together form 16β-methyl-16α,17α-oxido, and wherein said compound of Formula A is treated with sodium azide in aqueous dioxane-methanol;

and wherein said resulting 6β - azido - 7α-hydroxy-4-pregnene-3,20-dione of Formula B is treated with acetic acid, trifluoroacetic anhydride and p-toluenesulfonic acid;

and wherein said resulting 6β-azido-7α-acyloxy-4-pregnene-3,20-dione of Formula C is treated with tetramethylammonium fluoride in acetonitrile;

said process comprising treating 6α,7α; 16α,17α-bis-oxido-16β - methyl - 4 - pregnene-3,20-dione with sodium azide in aqueous dioxane-methanol;

treating the thereby formed 6β - azido - 7α-hydroxy-16β-methyl-16α,17α-oxido - 4 - pregnene-3,20-dione with acetic acid, trifluoroacetic anhydride and p-toluenesulfonic acid;

and treating the thereby formed 6β - azido - 7α,17α-diacetoxy - 16 - methylene - 4 - pregnene-3,20-dione with tetramethylammonium fluoride in acetonitrile, whereby is prepared 6 - azido - 16 - methylene-17α-acetoxy-4,6-pregnadiene-3,20-dione.

18. 6 - azido - 16β - lower alkyl - 16α,17α - oxido-4,6-pregnadiene-3,20-dione.

19. A compound according to claim 18 wherein said 16β-lower alkyl is 16β-methyl, said compound being 6-azido - 16β - methyl - 16α,17α-oxido-4,6-pregnadiene-3,20-dione.

20. 6β - azido - 7α - OR-16β-lower alkyl-16α,17α-oxido - 4 - pregnene-3,20-dione wherein R is a member selected from the group consisting of hydrogen and hydrocarbonsulfonyl having up to 7 carbon atoms.

21. A compound according to claim 20 wherein R is hydrogen and 16β-lower alkyl is 16β-methyl, said compound being 6β - azido - 7α - hydroxy - 16β - methyl-16α,17α-oxido-4-pregnene-3,20-dione.

22. A compound according to claim 20 wherein R is methanesulfonyl and 16β - lower alkyl is 16β-methyl, said compound being 6β - azido - 7α - methanesufonyloxy-16β-methyl - 16α,17α - oxido-4-pregnene-3,20-dione.

23. A compound according to claim 1, Formula I, wherein Q is hydroxy, W is (H,α-methyl), X is fluorine, Y is (H,βOH) and Z is hydrogen, said compound being 6 - azido - 9α - fluoro-11β,17α-dihydroxy-16α-methyl-4,6-pregnadiene-3,20-dione.

24. A 1,2-dehydro compound according to claim 1, wherein Q is hydroxy, W is (H,α-methyl), X is fluorine, Y is (H,βOH) and Z is hydrogen, said compound being 6 - azido - 9α - fluoro - 11β,17α-dihydroxy-16α-methyl-1,4,6-pregnatriene-3,20-dione.

25. A compound according to claim 1, Formula 1, wherein Q is hydroxy, W is (H,β-methyl), X is fluorine, Y is (H,βOH) and Z is hydrogen, said compound being 6-azido - 9α - fluoro - 11β,17α - dihydroxy-16β-methyl-4,6-pregnadiene-3,20-dione.

26. A 1,2-dehydro compound according to claim 1 wherein Q is hydroxy, W is (H,β-methyl), X is fluorine, Y is (H,βOH) and Z is hydrogen, said compound being 6 - azido - 9α - fluoro-11β,17α-dihydroxy-16β-methyl-1,4,6-pregnatriene-3,20-dione.

References Cited

UNITED STATES PATENTS 3,629,244 12/1971 Costerousse _____ 260—397.45
3,639,434 2/1972 Oxley et al. _____ 260—397.45

ELBERT L. ROBERTS, Primary Examiner

U.S. Cl. X.R.

260—397.3, 397.4, 397.45, 397.47, 349

UNITED STATES PATENT AND TRADEMARK OFFICE
CERTIFICATE OF CORRECTION

PATENT NO. : 3,781,276
DATED : December 25, 1973
INVENTOR(S) : Elliot L. Shapiro et al Page 1 of 3

It is certified that error appears in the above-identified patent and that said Letters Patent are hereby corrected as shown below:

Column 1, line 67, "active azido-6-" should read --active 6-azido-6--. Column 2, line 65, "oxygen (Hβ-OH')," should read --oxygen, (H,βOH),--. Column 3, line 65, "conditions requires" should read --conditions requiring--. Column 5, line 10, "-16α,17α-isopropylidiene-" should read --16α,17α-isopropylidene--. Column 5, line 28, "and the 16α-methyl epimer" should read --and the 16α-methyl epimer thereof--. Column 5, lines 29 and 30, "-6-azido-9α,11β-dichloro-16β-methyl-17α-acetoxy-4,6- thereof and" should not appear. Column 6, line 28, " 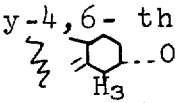 II " should read -- 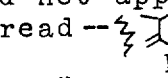 II --

Column 6, line 52, "-17α-acetoxy-4,6-pregnadiene-" should read --17α-acetoxy-4-pregnene--. Column 6, line 56, "-17α-acetoxy-4,6-pregnadiene-" should read --17α-acetoxy-4-pregnene--. Column 6, line 59, "-4,6-pregnadiene-3,20-" should read --4-pregnene-3,20--. Column 6, lines 64 and 65, "-4,6-pregnadiene-" should read ---4-pregnene--. Column 6, line 68, "-6-dehydoprogesterones-" should read --6-dehydroprogesterones--. Column 13, line 21, "-16-lower alkyidene-" should read --16-lower alkylidene---. Column 14, line 36, "/TEAA→ I " should read -- /TFAA→ I --. Column 15, line 4, "the possiblity" should read --the possibility--. Column 15, lines 15 and 16, "-3,20-dinoe-" should read --3,20-dione--. Column 15, line 52, "-acetoxy-49(11)-" should read --acetoxy-4,9(11)--. Column 16, line 65, "from the 6β-azido-7α-acyloxy-4-pregnene-" should read --from the 6β-azido-7α-hydroxy-4-pregnene or the 6β-azido-7α-acyloxy-4-pregnene--. Column 17, line 40, "should possess" should read --ought possess--. Column 18, line 73, "is advanageously" should read --is advantageously--. Column 19, line 13, "-1,4-pregnadriene-" should read --1,4-pregnadiene--. Column 19, line 20, "-6-azidio-" should read --6-azido--. Column 20, line 32, "remaiing" should read --remaining--. Column 20, line 53, "propylparaben, USF" should read --propylparaben, USP---. Column 22, line 28, "-7-p-tolene-sulfonate-" should read --7-p-toluene-sulfonate--. Column 23, line 49, "-17α-acetyl-" should

UNITED STATES PATENT AND TRADEMARK OFFICE
CERTIFICATE OF CORRECTION

PATENT NO. : 3,781,276
DATED : December 25, 1973
INVENTOR(S) : Elliot L. Shapiro et al Page 2 of 3

It is certified that error appears in the above-identified patent and that said Letters Patent are hereby corrected as shown below:

read --17α-acetoxy--. Column 26, line 14, "of 210 g. of" should read --of 2.0 g. of--. Column 27, line 29, "-9β,11β-dichloro-" should read --9α,11β-dichloro--. Column 28, line 21, "-17α,17α-" should read --7α,17α--. Column 28, line 33, "in Example 10" should read --in Example 1C--. Column 28, lines 35 and 36, "-5,20-dione," should read --3,20-dione,--. Column 29, line 44, "-17α-4-" should read --17α-acetoxy-4--. Column 30, line 28, "-pregnene3,20-dione," should read --pregnene-3,20-dione,--. Column 30, line 72, "-7α-hydroxy16α-" should read --7α-hydroxy-16α--. Column 32, line 32, "-methyl4-pregnene-" should read --methyl-4-pregnene--. Column 32, line 45, "-β6-azido-" should read --6β-azido--. Column 34, line 22, "-4-pregnadiene-" should read --4-pregnene--. Column 34, line 24, "in Example 10" should read --in Example 1C--. Column 34, line 30, "in Example 10" should read --in Example 1C--. Column 34, line 40, "-11β,ol-" should read --11β-ol--. Column 39, line 30, "-2-ol-" should read --21-ol--. Column 40, line 37, "-17β-ol-" should read --17α-ol--. Column 42, line 42, "-17α-hydroxyl-" should read --17α-hydroxy--. Column 43, line 17, Claim 1, "OR, wherein R" should read --OR wherein R--. Column 43, line 20, Claim 1, "and hydrogen, provided" should read --and hydrogen provided--. Column 43, line 27, Claim 1, "and chlorine, and W taken together with Q when Q is" should read --and chlorine, and Q when Q is--. Column 44, line 2, Claim 8, "OR, wherein R is" should read --OR wherein R is--. Column 44, lines 17 and 18, Claim 8, "and, together with Q when Q is" should read --and, when Q is--. Column 44, line 38, Claim 9, "-4,6-pregnadiene-" should read --4-pregnene--. Column 44, line 42, Claim 10, "-4,6-pregnadiene-" should read --4-pregnene--. Column 44, lines 44 and 45, Claim 11, "wherein Q is hydroxy, W is $=CH_2$ and V, X, Y and Z" should read --wherein Q is acetoxy, W is $=CH_2$, V is acetyl, and X, Y and Z--. Column 44, lines 46 and 47, Claim 11, "-7α,17α-hydroxy-16-methylene-4,6-pregnadiene-" should read --7α,17α-diacetoxy-16-methylene-4-pregnene--. Column 44, line 63,

UNITED STATES PATENT AND TRADEMARK OFFICE
CERTIFICATE OF CORRECTION

PATENT NO. : 3,781,276
DATED : December 25, 1973
INVENTOR(S) : Elliot L. Shapiro et al Page 3 of 3

It is certified that error appears in the above-identified patent and that said Letters Patent are hereby corrected as shown below:

Claim 12, "OR, wherein R is" should read --OR wherein R is--. Column 44, line 73, Claim 12, "and, together with Q when Q is hydroxy" should read --and when Q is hydroxy--. Column 45, line 26, Claim 12, "W' and Q' form" should read --W' and Q' represent--. Column 45, line 72, Claim 13, "produced hereby" should read --produced thereby--. Column 47, line 7, Claim 22, "methanesufonyloxy" should read --methanesulfonyloxy--.

Signed and Sealed this

Twenty-second Day of February 1977

[SEAL]

Attest:

RUTH C. MASON
Attesting Officer

C. MARSHALL DANN
Commissioner of Patents and Trademarks